(12) United States Patent
Nishide et al.

(10) Patent No.: US 12,373,028 B2
(45) Date of Patent: *Jul. 29, 2025

(54) IMAGING DISPLAY DEVICE AND WEARABLE DEVICE

(71) Applicant: CANON KABUSHIKI KAISHA, Tokyo (JP)

(72) Inventors: Yosuke Nishide, Kawasaki (JP); Takeshi Ichikawa, Hachioji (JP); Yu Maehashi, Yokohama (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,850

(22) Filed: Mar. 11, 2024

(65) Prior Publication Data

US 2024/0211043 A1    Jun. 27, 2024

Related U.S. Application Data

(63) Continuation of application No. 18/156,073, filed on Jan. 18, 2023, now Pat. No. 11,972,045, which is a
(Continued)

(30) Foreign Application Priority Data

Jun. 28, 2019   (JP) .................................. 2019-121949
Apr. 17, 2020   (JP) .................................. 2020-074083

(51) Int. Cl.
*G06F 3/01*    (2006.01)
*G06T 3/40*    (2024.01)
*G06T 7/11*    (2017.01)
*G06V 10/82*   (2022.01)
*G06V 40/19*   (2022.01)

(52) U.S. Cl.
CPC ................ *G06F 3/013* (2013.01); *G06T 3/40* (2013.01); *G06T 7/11* (2017.01); *G06V 10/82* (2022.01); *G06T 2207/20081* (2013.01); *G06V 40/19* (2022.01)

(58) Field of Classification Search
CPC ........... G06V 40/1318; G06V 40/1365; G06V 40/1388; G06V 40/45
See application file for complete search history.

(56) References Cited

U.S. PATENT DOCUMENTS 10,616,568 B1 *  4/2020  Lin ...................... H04N 13/383
10,977,815 B1 *  4/2021  Chao ...................... G06F 3/013
(Continued)

*Primary Examiner* — Lixi C Simpson
(74) *Attorney, Agent, or Firm* — Canon U.S.A., Inc. IP Division

(57) ABSTRACT

An imaging display device includes an imaging unit, a processing unit, a display unit, and a pupil detection unit. The imaging unit includes a plurality of photoelectric conversion elements and is configured to acquire first image information. The processing unit is configured to process a signal from the imaging unit and generate second image information. The display unit is configured to display an image that is based on the signal from the processing unit. The pupil detection unit is configured to detect vector information of a pupil. The processing unit generates the second image information by processing the first image information based on the vector information on the pupil.

39 Claims, 13 Drawing Sheets

Related U.S. Application Data continuation of application No. 16/910,859, filed on Jun. 24, 2020, now Pat. No. 11,579,688.

(56) References Cited

U.S. PATENT DOCUMENTS

| | | | |
|---|---|---|---|
| 10,979,685 B1* | 4/2021 | Silverstein | H04N 13/117 |
| 11,972,045 B2* | 4/2024 | Nishide | H04N 23/60 |
| 2017/0075858 A1* | 3/2017 | Yerli | H01L 25/0655 |
| 2017/0372457 A1* | 12/2017 | Sylvan | G06F 1/163 |
| 2018/0084647 A1* | 3/2018 | Nalla | H05K 3/4697 |
| 2019/0354173 A1* | 11/2019 | Young | G06F 3/012 |
| 2020/0019782 A1* | 1/2020 | Narayanaswami | G09G 3/002 |
| 2020/0296310 A1* | 9/2020 | Hicks | H04N 19/98 |
| 2020/0297270 A1* | 9/2020 | Ando | A61B 5/363 |

* cited by examiner

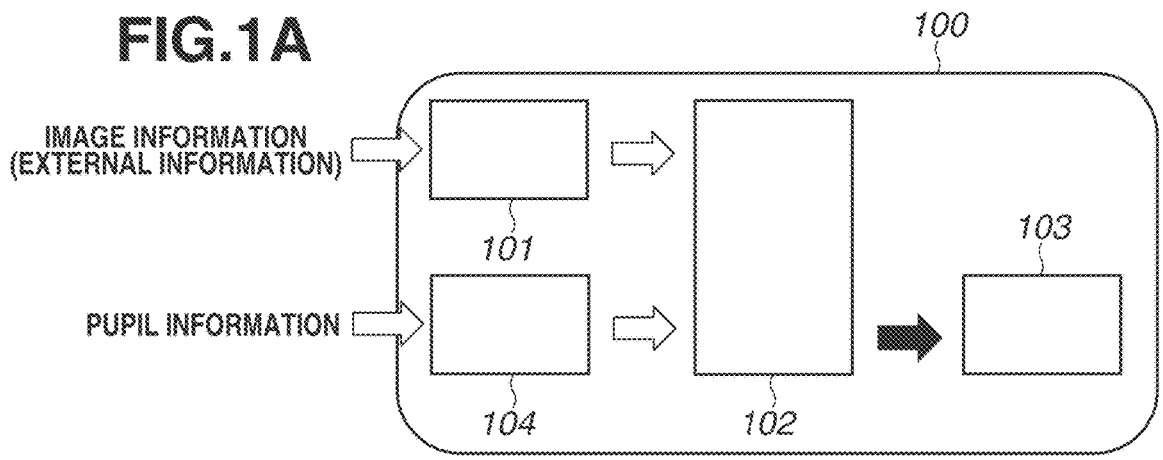
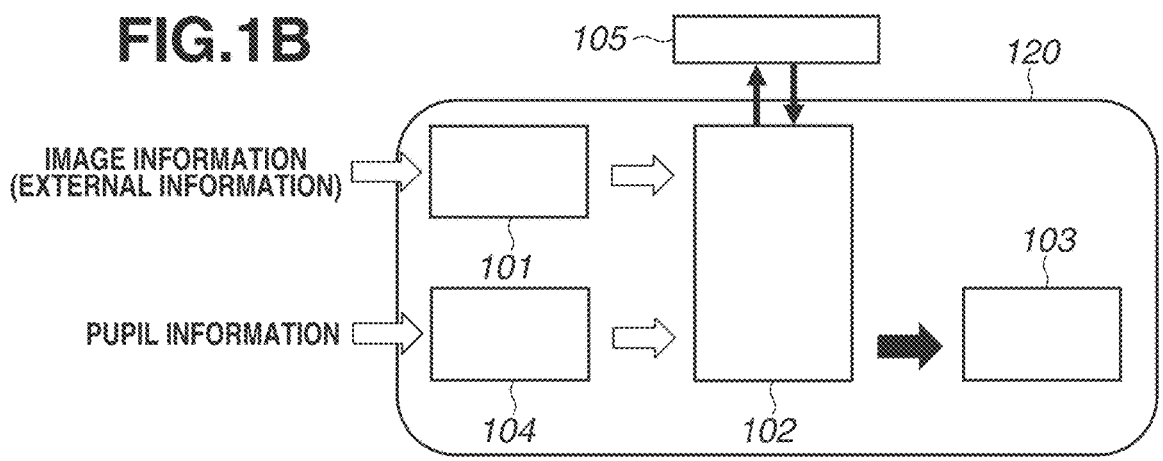
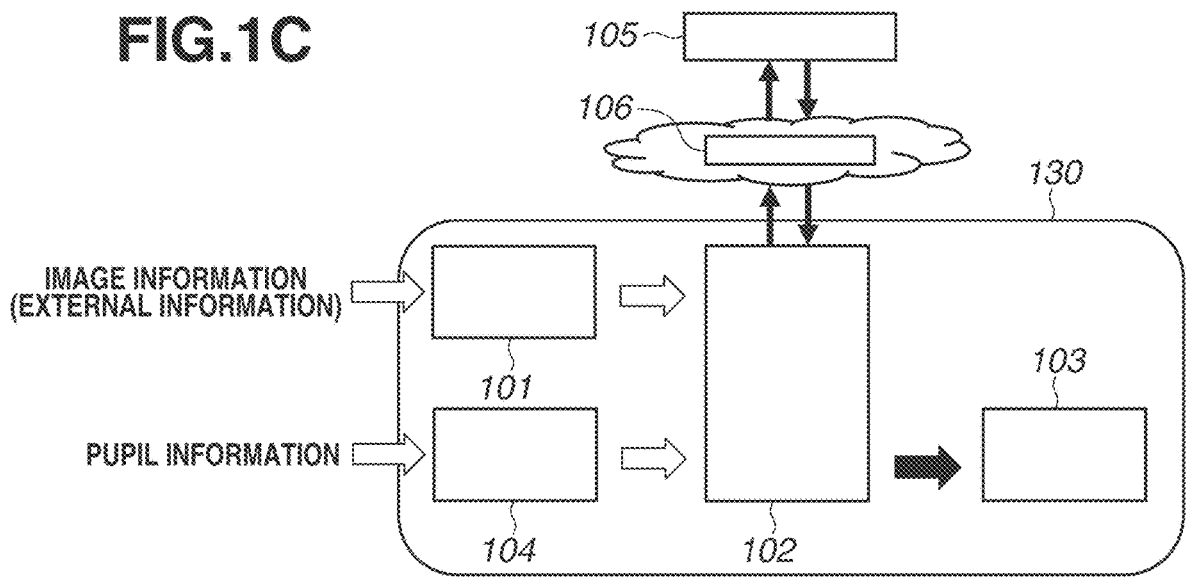

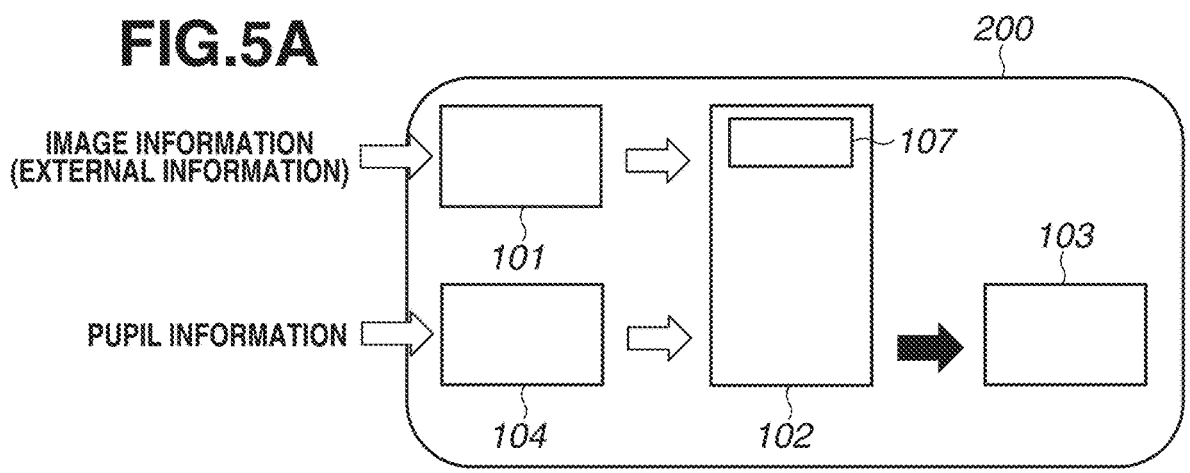
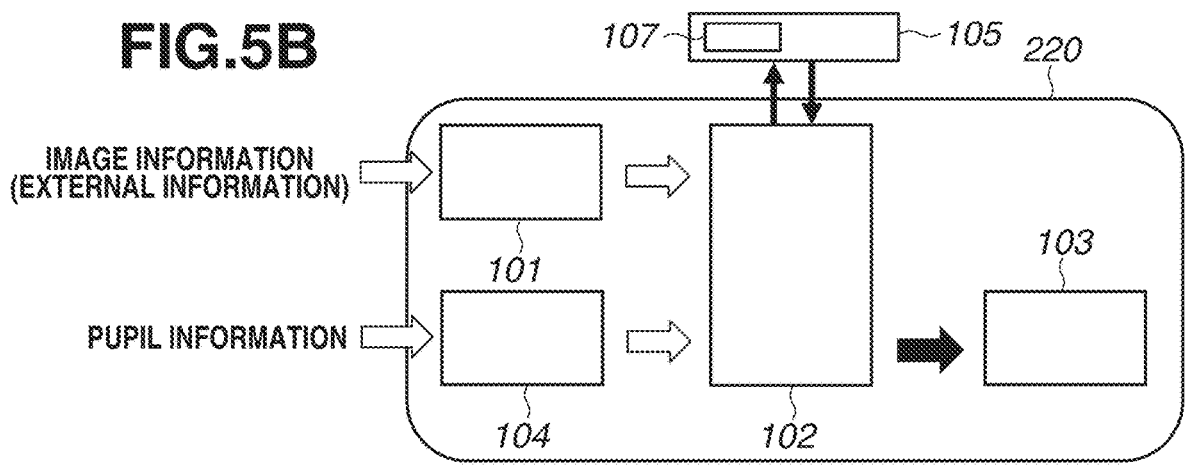
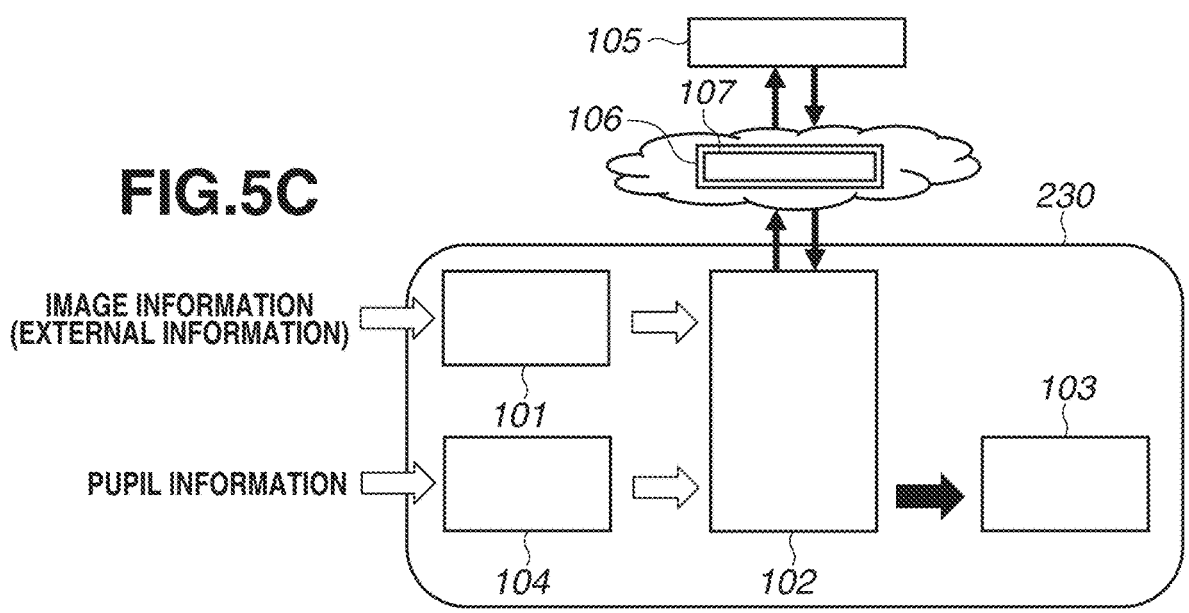

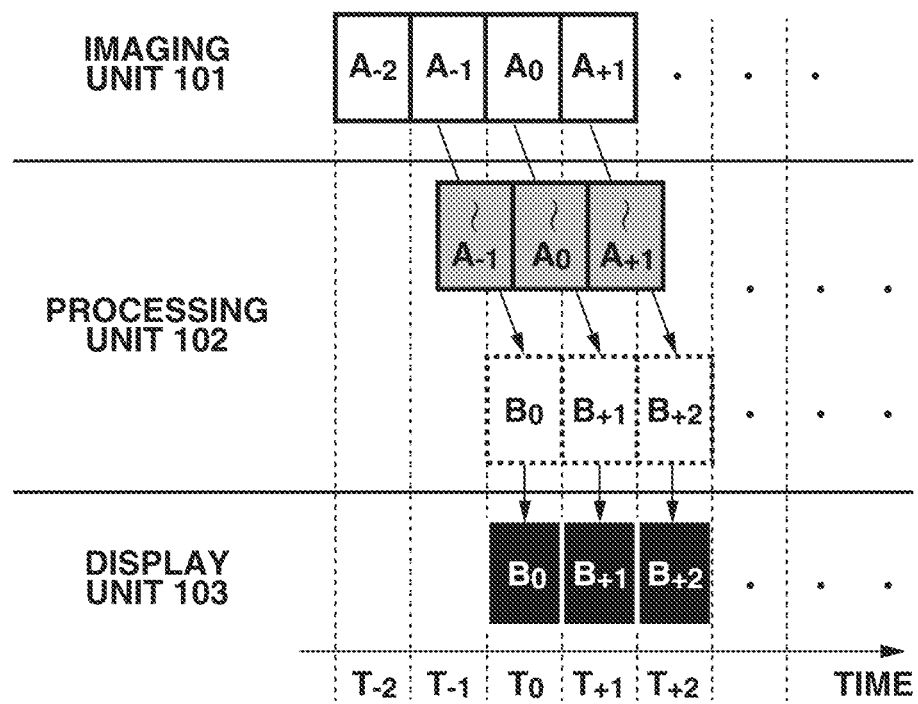
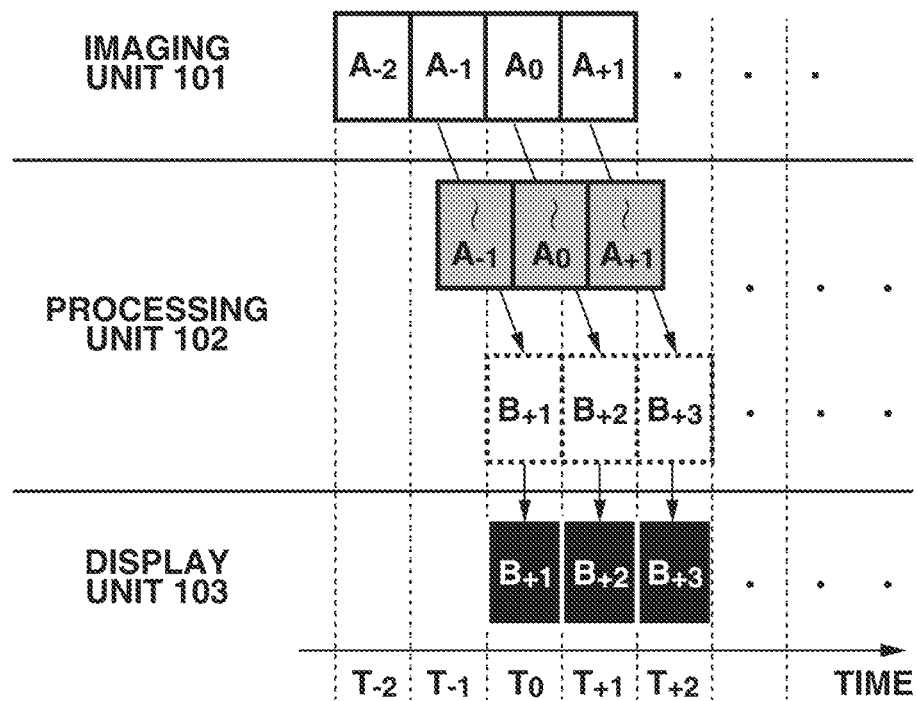

IMAGING DISPLAY DEVICE AND WEARABLE DEVICE

CROSS-REFERENCE TO RELATED APPLICATION

This application is a Continuation of U.S. application Ser. No. 18/156,073, filed Jan. 18, 2023; which is a Continuation of U.S. application Ser. No. 16/910,859, filed Jun. 24, 2020, no U.S. patent Ser. No. 11/579,688, issued Feb. 14, 2023; which claims priority from Japanese Patent Application No. 2019-121949, filed Jun. 28, 2019, and No. 2020-074083, filed Apr. 17, 2020, which are hereby incorporated by reference herein in their entireties.

BACKGROUND

Field

One disclosed aspect of the embodiments relates to an imaging display device and a wearable device.

Description of the Related Art

Wearable devices, which are called, for example, a head mounted display and smart glasses, including an imaging display device have been known. In a system used in such a wearable device, a scenery in front of a user is captured as an image using an imaging apparatus, and the image is displayed on a display device. By the system, the user can feel as if the user is directly seeing the scenery in an external world while the user sees the scenery through the display device. If there is a large difference between an image displayed on the display device and an image of the external world, the user feels uncomfortable or feels sick. Thus, research and development for reducing the difference have been widely conducted.

Japanese Patent Application Laid-Open No. 2004-222254 discusses a technique of generating image information on an image captured at the center position of a lens of glasses, from image information obtained by image capturing using a plurality of image sensors arranged at a glasses frame.

While the technique discussed in Japanese Patent Application Laid-Open No. 2004-222254 generates image information on an image captured at the center position of the lens of glasses, a positional relationship between the lens of glasses and a pupil of a user is not factored in. In a case where there is a large difference between a central axis of a pupil and the center position of a lens of glasses, a difference between a captured image and a real image can occur. Particularly in an imaging display device including a display unit, a difference is generated between a display image and a real event, and therefore the user might feel uncomfortable.

SUMMARY

According to an aspect of the embodiments, an imaging display device includes an imaging unit, a processing unit, a display unit, and a pupil detection unit. The imaging unit includes a plurality of photoelectric conversion elements, and is configured to acquire first image information. The processing unit is configured to process the first image information from the imaging unit and generate second image information. The display unit is configured to display an image that is based on the second image information from the processing unit. The pupil detection unit is configured to acquire vector information on a pupil. The processing unit generates the second image information by processing the first image information based on the vector information on the pupil.

Further features of the disclosure will become apparent from the following description of exemplary embodiments with reference to the attached drawings.

BRIEF DESCRIPTION OF THE DRAWINGS

FIGS. 1A, 1B, and 1C are schematic diagrams illustrating an imaging display device according to a first exemplary embodiment.

FIGS. 5A, 5B, and 5C are schematic diagrams illustrating an imaging display device according to a third exemplary embodiment.

FIGS. 6A and 6B are schematic diagrams illustrating an imaging display device according to a fourth exemplary embodiment.

DESCRIPTION OF THE EMBODIMENTS

Figure 2A:
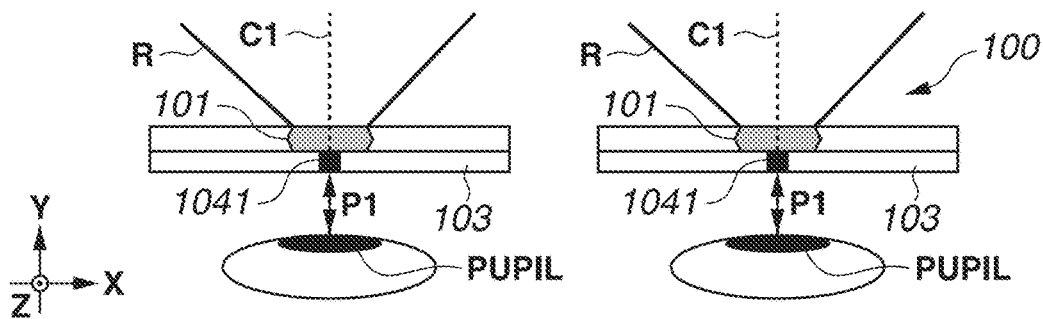
FIGS. 2A, 2B, 2C, and 2D are schematic diagrams illustrating the imaging display device according to the first exemplary embodiment.

Hereinafter, exemplary embodiments will be described with reference to the drawings. In the description of each exemplary embodiment, the description of the same configurations as those in another exemplary embodiment will be omitted in some cases. In addition, the exemplary embodiments can be appropriately changed or combined.

A first exemplary embodiment will be described with reference to FIGS. 1A, 1B, 1C, 2A, 2B, 2C, and 2D. FIG. 1A is a schematic diagram illustrating an imaging display device 100 according to the present exemplary embodiment. The imaging display device 100 includes an imaging unit 101, a processing unit 102, a display unit 103, and a pupil detection unit 104.

The imaging unit 101 includes a plurality of light receiving elements. For example, the light receiving element is a photoelectric conversion element, and performs an image capturing operation of converting light emitted from the outside (external information), into an electronic signal and acquiring image information. The pupil detection unit 104 includes a plurality of light receiving elements. For example, the light receiving element is a photoelectric conversion element, converts light into an electronic signal, and detects pupil information. The pupil information at least includes vector information between the pupil detection unit 104 and a pupil, and may include the size of the pupil and information regarding a line of sight. The vector information includes a distance between the pupil and the pupil detection unit 104, and a direction from the pupil detection unit 104 to the pupil, for example. The processing unit 102 generates image information (hereinafter, referred to as pupil-based adjusted image information) obtained by adjusting image information from the imaging unit 101 using pupil information obtained from the pupil detection unit 104. The display unit 103 includes a plurality of light emitting elements. The plurality of light emitting elements converts light into an electronic signal. The display unit 103 displays (outputs) an image corresponding to the pupil-based adjusted image information generated by the processing unit 102. In the imaging unit 101 and the display unit 103, it can also be said that a plurality of pixels is arranged in an array. Each pixel of the imaging unit 101 includes at least one light receiving element, and each pixel of the display unit 103 includes at least one light emitting element. The processing unit 102 receives image information from the imaging unit 101 and outputs pupil-based adjusted image information to the display unit 103. The processing unit 102 can also output a control signal of an image capturing operation to the imaging unit 101, and output a control signal of a display operation to the display unit 103.

FIG. 1B is a schematic diagram illustrating a modified example of the imaging display device 100 according to the present exemplary embodiment that is illustrated in FIG. 1A. The processing unit 102 of an imaging display device 120 can communicate with a processing device 105. The processing unit 102 and the processing device 105 connect with each other via a network. The processing device 105 is provided on the outside of the imaging display device 120, and may be provided on a cloud, for example. The processing unit 102 and the processing device 105 exchange information with each other, and generate pupil-based adjusted image information from image information and pupil information. In FIG. 1B, image information obtained by image capturing using the imaging unit 101 is converted into pupil-based adjusted image information by the processing unit 102 that has obtained information from the processing device 105. In this manner, the imaging display device 120 can generate pupil-based adjusted image information using information accumulated in an external device.

FIG. 1C is a schematic diagram illustrating a modified example of the imaging display device 100 according to the present exemplary embodiment that is illustrated in FIG. 1A. The processing unit 102 of an imaging display device 130 communicates with a processing device 106, and the processing device 106 further communicates with another processing device 105. The processing device 106 is on a cloud and performs data accumulation, for example. The processing unit 102 and the processing device 105 connect with each other via a network, and the processing device 106 and the processing device 105 connect with each other via a network. In FIG. 1C, the processing unit 102 receives setting information accumulated in the processing device 106, and generates pupil-based adjusted image information based on the setting information. The setting information includes various values for generating pupil-based adjusted image information, such as body information on the user and basic information regarding an environment and a target object. The processing unit 102 also transmits a plurality of pieces of information including image information from the imaging unit 101, to the processing device 106. The plurality of pieces of information is transmitted to the processing device 105 via the processing device 106. Based on the plurality of pieces of received information, the processing device 105 generates various values for generating pupil-based adjusted image information, and transmits the generated various values to the processing device 106. The processing device 106 updates basic information and various values that are accumulated therein, and holds the updated basic information and values as new information. In this manner, the imaging display device 130 can generate pupil-based adjusted image information using information accumulated in an external device.

The pupil detection unit 104 of the imaging display device according to the present exemplary embodiment will now be described with reference to FIGS. 2A, 2B, 2C, and 2D. FIGS. 2A, 2B, 2C, and 2D are schematic diagrams illustrating the imaging display device according to the present exemplary embodiment. FIGS. 2A, 2B, 2C, and 2D illustrate a case where the imaging display device 100 illustrated in FIG. 1A includes an eyewear-shaped casing. While FIGS. 2A, 2B, 2C, and 2D illustrate a case where the imaging display device 100 includes two display units 103, the imaging display device 100 may have a configuration including one display unit 103 and one imaging unit 101. As illustrated in FIGS. 2A, 2B, 2C, and 2D, the pupil detection unit 104 at least includes a pupil detection unit 1041. The pupil detection unit 1041 acquires vector information between a pupil and the pupil detection unit 1041. Based on the vector information obtained by the pupil detection unit 1041, the processing unit 102 generates vector information between the pupil and the imaging unit 101. Then, using the vector information between the pupil and the imaging unit 101, the processing unit 102 performs adjustment to eliminate a difference in spatial position of a target object that can be generated between image information and a real image. The processing unit 102 adjusts image information acquired by the imaging unit 101 and generates pupil-based adjusted image information. By using the pupil-based adjusted image information, a display image just like a real image can be displayed on the display unit 103. All of FIGS. 2A, 2B, 2C, and 2D illustrate a case where a central axis C1 of a certain pupil coincides with the center of one display unit 103 facing the corresponding pupil. A range R indicates a range in which image capturing is performed by the imaging unit 101.

In FIG. 2A, the imaging unit 101 and the pupil detection unit 1041 are arranged on the central axis C1 of the pupil. The pupil detection unit 1041 acquires vector information P1 between the pupil and the pupil detection unit 104. The image information acquired by the imaging unit 101 is adjusted based on the vector information P1. Since the pupil detection unit 1041 and the imaging unit 101 are arranged on the central axis C1, adjustment is performed factoring in just a distance between the pupil and the imaging unit 101 that is included in the vector information P1. Accordingly, a processing load on image information is reduced and a processing time can be shortened. Power consumption can be also reduced.

Figure 2B:
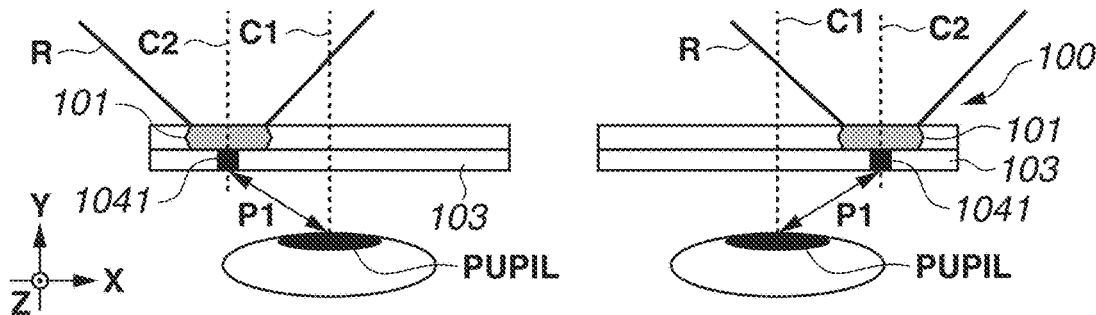

In FIG. 2B, both of the imaging unit 101 and the pupil detection unit 1041 are not on the central axis C1 of the pupil. More specifically, the imaging unit 101 and the pupil detection unit 1041 are arranged outward from the central axis C1 by a predetermined distance in an X direction. The pupil detection unit 1041 is on a central axis C2 of the imaging unit 101. The pupil detection unit 1041 acquires the vector information P1 between the pupil and the pupil detection unit 104. The processing unit 102 preliminarily holds vector information between the pupil detection unit 1041 and the imaging unit 101. Image information acquired by the imaging unit 101 is adjusted based on the vector information P1. The vector information P1 includes a distance from the central axis C1 to the central axis C2, and a distance from the pupil to the pupil detection unit 104. Since the imaging unit 101 and the pupil detection unit 1041 are positioned on the same central axis C2, vector information between the pupil and the imaging unit 101 can be easily generated from information obtained by the pupil detection unit 1041. As compared with the case illustrated in FIG. 2A, a freedom degree in the arrangement of another portion such as the display unit 103 increases, and this can contribute to the miniaturization of the imaging display device.

Figure 2C:
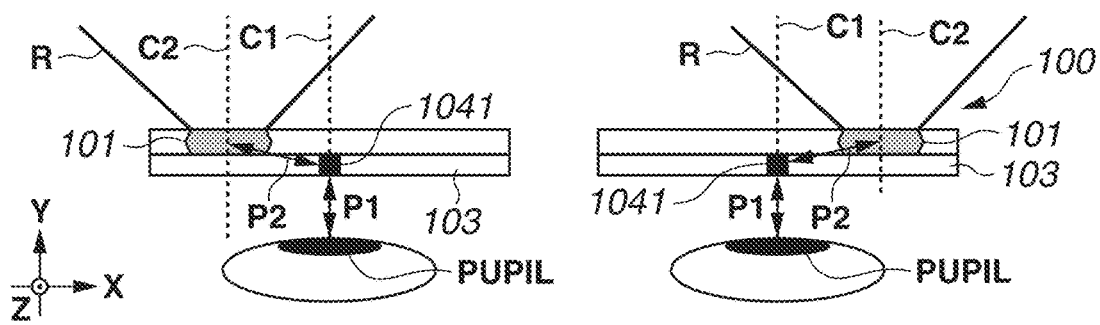

In FIG. 2C, while the pupil detection unit 1041 is arranged on the central axis C1 of the pupil, the imaging unit 101 is not arranged on the central axis C1 of the pupil. The central axis C2 of the imaging unit 101 is arranged outward from the central axis C1 by a predetermined distance in the X direction. The processing unit 102 preliminarily holds vector information P2 between the pupil detection unit 1041 and the imaging unit 101. The pupil detection unit 1041 acquires the vector information P1 between the pupil and the pupil detection unit 1041. Based on the vector information P2 and the vector information P1, the processing unit 102 adjusts image information acquired by the imaging unit 101, and acquires pupil-based adjusted image information.

Figure 2D:
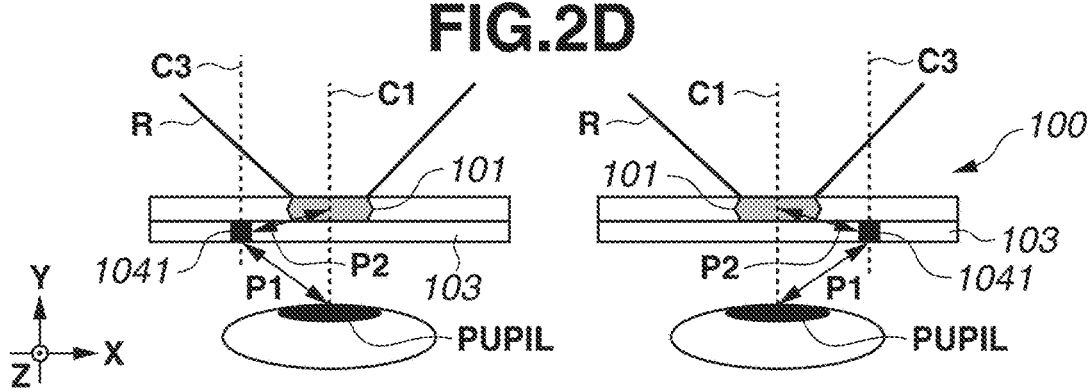

In FIG. 2D, while the imaging unit 101 is arranged on the central axis C1 of the pupil, the pupil detection unit 1041 is not arranged on the central axis C1 of the pupil. A central axis C3 of the pupil detection unit 1041 is arranged outward from the central axis C1 by a predetermined distance. In this configuration, the processing unit 102 preliminarily holds the vector information P2 including a distance between the imaging unit 101 and the pupil detection unit 1041. The pupil detection unit 1041 acquires the vector information P1 including a distance from the pupil. Based on the vector information P2 and the vector information P1, the processing unit 102 adjusts image information acquired by the imaging unit 101, and acquires pupil-based adjusted image information.

As illustrated in FIGS. 2A, 2B, 2C, and 2D, by using the pupil detection unit 1041, image information obtained by the imaging unit 101 can be displayed on the display unit 103 just like an actually-viewed image. A plurality of pupil detection units 1041 may be provided, and one piece of pupil information with high accuracy may be generated from a plurality of pieces of pupil information. The vector information in FIGS. 2A, 2B, 2C, and 2D has been described to include information in the X direction and a Y direction, but actually, the vector information can include information in a sheet surface depth direction, that is to say, information in a Z direction.

Figure 3:
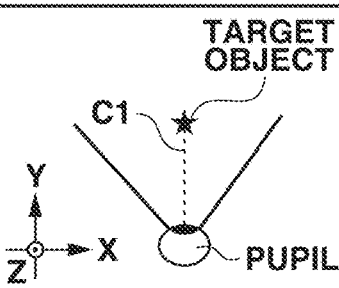
FIG. 3 is a table illustrating an operation of the imaging display device according to the first exemplary embodiment.

Next, while comparing with another example, the imaging display device according to the present exemplary embodiment will be described with reference to FIG. 3. FIG. 3 is a table illustrating an operation of the imaging display device according to the present exemplary embodiment. For the sake of simplifying the description, the description will be given with reference to FIG. 3 using a part of the configurations illustrated in FIGS. 2A, 2B, 2C, and 2D. Specifically, only a portion of glasses that corresponds to one eye is extracted from the eyewear-shaped imaging display device.

FIG. 3 illustrates configurations of Examples 1 to 3, a real image or a display image displayed on the display unit 103, and image information acquired by the imaging unit 101. Example 1 illustrates a case where a target object is actually viewed by an eye, and Examples 2 and 3 illustrate a case according to the present exemplary embodiment.

First of all, Example 1 illustrates a case where a target object is actually viewed by an eye. In a positional relationship between a pupil and a target object in this example, the target object is on the central axis C1 of the pupil. As illustrated in a real image in Example 1, it is recognized that the target object is on the central axis of the pupil, the target object is at a position distant by a predetermined linear distance, and a size of the target object is a predetermined size.

Example 2 illustrates a case according to the present exemplary embodiment. In Example 2, while the target object is on the central axis C1 of the pupil, the imaging unit 101 is arranged outward from the central axis C1 by a predetermined distance in the X direction. In other words, in Example 2, the imaging unit 101 is not arranged on the central axis C1 of the pupil. Accordingly, in image information acquired by the imaging unit 101, the target object is shifted in a plus direction of the X direction. Furthermore, because image capturing is performed at a position closer to the target object by a distance between the pupil and the imaging unit 101, in the image information acquired by the imaging unit 101, a subject becomes larger than that in the real image. In Example 2, since adjustment is performed in a manner such that image capturing of the target object is performed on the central axis C1 of the pupil, the target object is displayed at the center in a display image, and an image close to the real image is obtained.

Example 3 illustrates a case of the imaging display device according to the present exemplary embodiment. In Example 3, the captured image in Example 2 is further adjusted based on a distance between the imaging unit 101 and the pupil. In Example 3, similarly to Example 2, while the target object is on the central axis C1 of the pupil, the imaging unit 101 is arranged outward from the central axis C1 by a predetermined distance. In other words, in Example 3, the imaging unit 101 is not arranged on the central axis C1 of the pupil. Accordingly, in image information acquired by the imaging unit 101, the target object is shifted rightward with respect to the sheet surface. Furthermore, because image capturing is performed at a position closer to the target object by a distance between the pupil and the imaging unit 101, in the image information acquired by the imaging unit 101, a subject becomes larger than that in the real image. In Example 3, because the image information obtained by the imaging unit 101 is adjusted based on the positions of the pupil and the imaging unit 101 and the distance between the pupil and the imaging unit 101. More specifically, as illustrated in a display image in Example 3, the target object is displayed in such a manner that the target object is on the central axis C1 of the pupil, the target object is at a position distant by a predetermined linear distance, and a size of the target object is a predetermined size. Accordingly, as compared with the image information acquired by the imaging unit 101, the target object is at the center, the target object is positioned at a distance, and the target object is displayed in a smaller size, in the display image. It can be seen that, as compared with the image information acquired by the imaging unit 101 in Example 2, the display image in Example 3 is similar to the real image illustrated in Example 1.

As described above, the user can desirably use the imaging display device according to the present exemplary embodiment without feeling uncomfortable. In an imaging unit and an eyewear-shaped imaging display device, for example, since the position of a pupil varies depending on the user, if a display image is generated based on vector information between the imaging unit and the center of the imaging display device corresponding to one eye, a difference can be generated between a real image and the display image. Using the imaging display device according to the present exemplary embodiment, a highly-accurate display image can be generated using a pupil detection unit, and a display image similar to a real image can be generated.

Next, a structure of the imaging display device 100 will be described. First of all, the photoelectric conversion element included in the imaging unit 101 can include a photodiode and a photoelectric conversion film, for example. Examples of material of the photodiode include silicon, germanium, indium, gallium, and arsenicum. Examples of the type of the photodiode include a PN junction photodiode, a PIN photodiode, and an avalanche photodiode.

For example, a complementary metal-oxide semiconductor (CMOS) image sensor can be used as the imaging unit 101, and the CMOS image sensor may be a front-side illumination CMOS image sensor or a backside illumination CMOS image sensor. In addition, the CMOS image sensor may have a stack structure of a semiconductor substrate on which a photodiode is arranged, and a semiconductor substrate on which a scanning circuit and a control circuit are arranged.

As the material of the photoelectric conversion film, there are organic material and inorganic material. For example, an organic photoelectric conversion film has a structure including at least one organic layer for photoelectric conversion between a pair of electrodes. An organic photoelectric conversion film may have a structure in which a plurality of organic layers is stacked between a pair of electrodes. An organic layer may be made of single material or made of a plurality of mixed materials. An organic layer can be formed using a vacuum deposition process or an application process, for example. Examples of an inorganic photoelectric conversion film include a quantum dot inorganic photoelectric conversion film that uses a quantum dot filmy layer containing fine semiconductor crystals in place of an organic layer, and a perovskite-type inorganic photoelectric conversion film including a photoelectric conversion layer including a transition metal oxide having a perovskite structure.

The display unit 103 includes a plurality of light emitting elements. Examples of the light emitting element include a liquid crystal display (LCD), an inorganic light emitting diode (LED), an organic LED (OLED), and a quantum dot LED (QLED). Examples of material used for an inorganic LED include aluminum, gallium, arsenicum, phosphorus, indium, nitrogen, selenium, zinc, diamond, zinc oxide, and a perovskite semiconductor. By making a PN junction structure using these materials, light having energy (wavelength) equivalent to a bandgap of materials is emitted. For example, an organic LED may include a light emitting layer containing at least one type of organic light emitting material between a pair of electrodes, may include a plurality of light emitting layers, may have a structure in which a plurality of organic layers is stacked, may include a light emitting layer made of single material, or may include a light emitting layer made of a plurality of materials. Light from a light emitting layer may be fluorescence or phosphorescence, or may be single-color light emission (blue, green, red, etc.) or white light emission. In addition, an organic layer can be formed using a vacuum deposition process or an application process, for example.

The pupil detection unit 104 includes a plurality of light receiving elements. Examples of the light receiving element include a photoelectric conversion element for obtaining image information that has been described above in the above-described imaging unit, and a distance measuring sensor for acquiring distance information from a pupil. As a system of the distance measuring sensor, a Time-Of-Flight (TOF) system can be used, but an element that can acquire vector information including another type of distance information may be used.

The imaging display device may have a structure in which at least four chips of the imaging unit 101, the processing unit 102, the display unit 103, and the pupil detection unit 104 are stacked and the chips are electrically connected with each other by a semiconductor process. The configurations of the imaging unit 101, the processing unit 102, the display unit 103, and the pupil detection unit 104 can be appropriately changed.

A second exemplary embodiment will be described with reference to FIGS. 4A, 4B, 4C, 4D, and 4E. FIGS. 4A to 4E are schematic diagrams illustrating an imaging display device according to the present exemplary embodiment. Other configurations are similar to those in the first exemplary embodiment. In the present exemplary embodiment, the pupil detection unit 104 further includes a function of detecting a movement of a line of sight and a state of a pupil. In addition to the pupil detection unit 1041, the pupil detection unit 104 includes a pupil detection unit 1042 for obtaining pupil information as image information. In the present exemplary embodiment, pupil information for detecting a line of sight and the state of a pupil is acquired from image information on the pupil. In the processing unit 102, pupil-based adjustment processing is performed based on information from the pupil detection unit 1041 and the pupil detection unit 1042, and generated pupil-based adjusted image information is displayed on the display unit 103. Because the movement of the line of sight and the state of the pupil can be thereby detected and adjusted, an image corresponding to the line of sight is displayed on the display unit 103. Specifically, for example, a region other than a region of interest (will also be referred to as an ROI region) can be displayed at low resolution, or an image in which a region of interest is enlarged or reduced can be displayed. A region of interest is estimated by the processing unit 102 based on a line of sight tracking result. In addition, pupil-based adjusted image information having luminance adjusted in accordance with the state of the pupil such as a size of the pupil, and being adjusted to a real image can also be generated. Accordingly, an image directly viewed by an eye and an image displayed on the imaging display device become consistent with each other. Moreover, an image corresponding to a line of sight is displayed. Thus, an image less uncomfortable for the user, that is to say, a display image similar to an image directly viewed by an eye can be obtained.

Aside from a method of acquiring an image of a pupil, the pupil detection unit 1042 can employ a method of detecting an outer rim of an iris of an eye, or a method of identifying the position of a pupil by emitting infrared light and using corneal reflection. The pupil detection unit 1042 can apply an arbitrary method in eye tracking.

The pupil detection unit 104 of the imaging display device according to the present exemplary embodiment will now be described with reference to FIGS. 4A, 4B, 4C, 4D, and 4E. FIGS. 4A, 4B, 4C, 4D, and 4E are diagrams corresponding to FIGS. 2A, 2B, 2C, and 2D. The imaging unit 101 and the pupil detection unit 1041 are similar to those in the first exemplary embodiment. As long as the pupil detection unit 1042 is at a position at which an image including information regarding the pupil and the state of the pupil can be captured, the pupil detection unit 1042 may be on the central axis C1 of the pupil or may not be on the central axis C1.

Figure 4A:
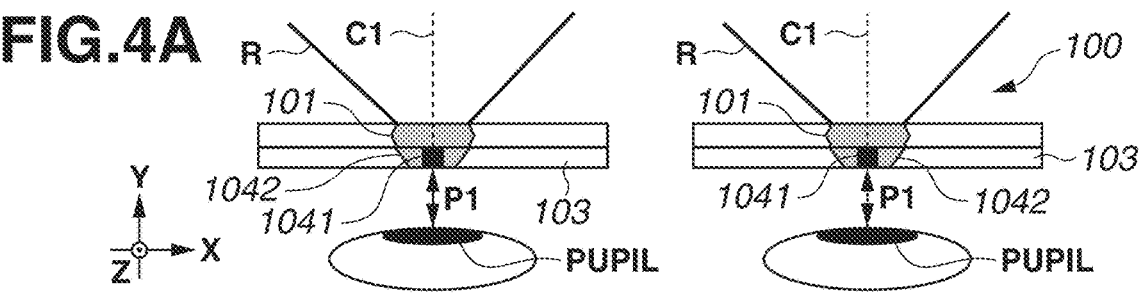
FIGS. 4A, 4B, 4C, 4D, and 4E are schematic diagrams illustrating an imaging display device according to a second exemplary embodiment.

In FIG. 4A, the imaging unit 101 and the pupil detection unit 1041 are on the central axis C1 of the pupil, similar to FIG. 2A. In addition, the pupil detection unit 1042 is on the central axis C1. In other words, the pupil detection unit 1041 and the pupil detection unit 1042 can be regarded as being at the same position. In such a case, pupil-based adjusted image information can be generated using the vector information P1, similar to FIG. 2A. Vector information between the pupil detection unit 1042 and the pupil detection unit 1041 can be preliminarily held by the processing unit 102 in the manufacturing of the imaging display device.

Figure 4B:
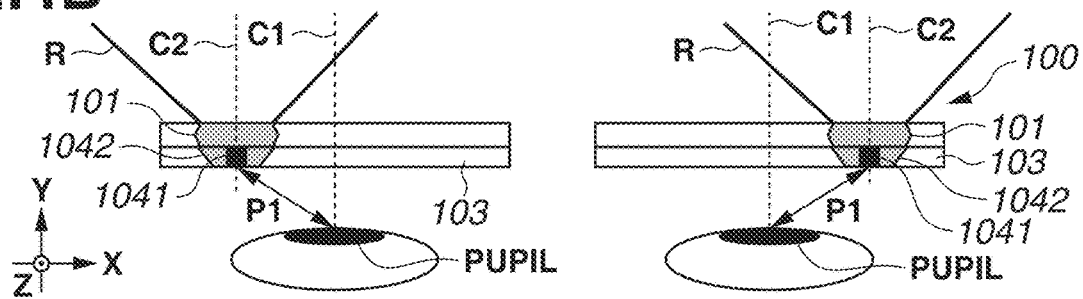

In FIG. 4B, the imaging unit 101 and the pupil detection unit 1041 are not on the central axis C1 of the pupil, similar to FIG. 2B. The pupil detection unit 1041 is on the central axis C2 of the imaging unit 101, and the central axis C1 and the central axis C2 are offset. In addition, the pupil detection unit 1042 is positioned on the central axis C2. In other words, the pupil detection unit 1041 and the pupil detection unit 1042 can be regarded as being at the same position. In such a case, pupil-based adjusted image information can be also generated similarly to FIG. 2B.

Figure 4C:
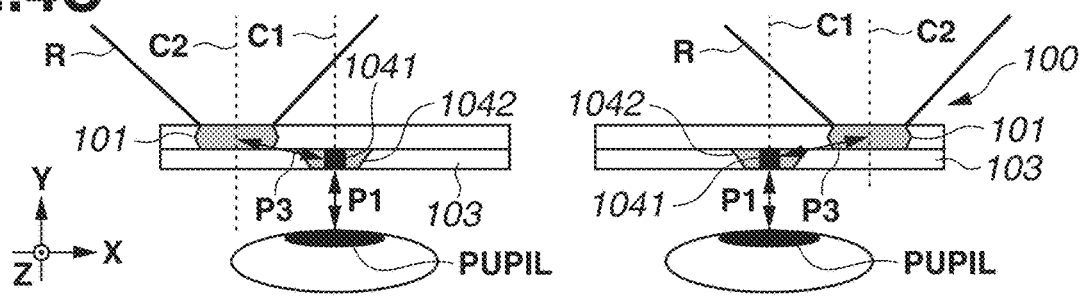

In FIG. 4C, similar to FIG. 2C, while the pupil detection unit 1041 is arranged on the central axis C1 of the pupil, the imaging unit 101 is not arranged on the central axis C1 of the pupil. The imaging unit 101 has the central axis C2 offset from the central axis C1. The pupil detection unit 1042 is on the central axis C1. In other words, the pupil detection unit 1041 and the pupil detection unit 1042 can be regarded as being at the same position. In such a case, pupil-based adjusted image information can be generated similarly to FIG. 2C.

Figure 4D:
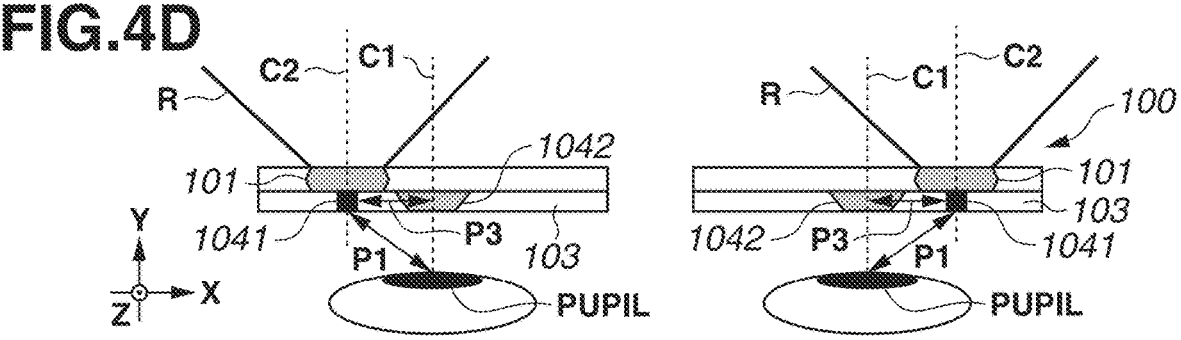

In FIG. 4D, similar to FIG. 2B, the imaging unit 101 and the pupil detection unit 1041 are not on the central axis C1 of the pupil. The pupil detection unit 1041 is on the central axis C2 of the imaging unit 101, and the central axis C1 and the central axis C2 are offset. In addition, the pupil detection unit 1042 is on the central axis C1. In such a case, pupil-based adjusted image information can be generated similarly to FIG. 2B. In this case, pupil information from the pupil detection unit 1042 can be adjusted using vector information P3 between the pupil detection unit 1041 and the pupil detection unit 1042.

Figure 4E:
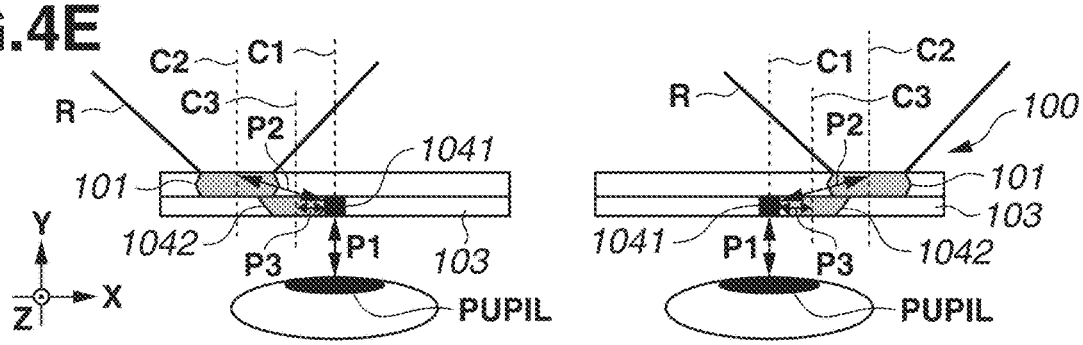

In FIG. 4E, similar to FIG. 2C, while the pupil detection unit 1041 is arranged on the central axis C1 of the pupil, the imaging unit 101 is not arranged on the central axis C1 of the pupil. The imaging unit 101 has the central axis C2 offset from the central axis C1. The pupil detection unit 1042 is arranged on neither the central axis C1 nor the central axis C2. The pupil detection unit 1042 has a central axis C3 that is offset from the central axis C1 and is offset from the central axis C2. The processing unit 102 preliminarily includes the vector information P2 between the pupil detection unit 1041 and the imaging unit 101, and the vector information P3 between the pupil detection unit 1042 and the pupil detection unit 1041. The pupil detection unit 1041 acquires the vector information P1 from the pupil. Based on the pieces of vector information P1 to P3, the processing unit 102 adjusts image information acquired by the imaging unit 101, and acquires pupil-based adjusted image information.

In addition, pupil information may be acquired using a plurality of pupil detection units 1042.

An imaging display device according to a third exemplary embodiment will be described with reference to FIGS. 5A to 5C. FIGS. 5A to 5C illustrate modified examples of the imaging display devices according to the first exemplary embodiment that are illustrated in FIGS. 1A to 1C.

FIG. 5A is a schematic diagram illustrating an imaging display device 200 according to the present exemplary embodiment. The imaging display device 200 is different from the imaging display device 100 according to the first exemplary embodiment that is illustrated in FIG. 1A in that the processing unit 102 further includes an AI unit 107 equipped with an intelligence (hereinafter, abbreviated as "AI") unit. The AI unit 107 may include a deep learning function. With this configuration, when pupil-based adjustment processing is performed based on information acquired by the pupil detection unit 104, the processing unit 102 can enhance the accuracy of pupil-based adjusted processing and increase the speed of pupil-based adjusted processing by using the deep learning function of the AI unit 107.

For example, by learning together with environmental information such as temperature humidity information, acceleration information, and pressure information, more accurate pupil-based adjusted image information can be generated. In addition, pupil-based adjusted image information can be generated more quickly by learning an action pattern from past pupil information on the user. By enhancing the accuracy of pupil-based adjusted processing, a difference between information directly viewed by an eye and information displayed on the imaging display device becomes smaller to each other, and the user can use the imaging display device comfortably. In addition, by increasing the speed of pupil-based adjusted processing, a time from when image information is acquired to when the image information is displayed can be shortened, and latency can be made smaller. The functions of the AI unit 107 are not limited to the above described functions. The functions of the AI unit 107 are not specifically designated as long as the functions enhance the performance of the imaging display device.

FIG. 5B illustrates a modified example of the imaging display device 120 illustrated in FIG. 1B. The processing unit 102 of an imaging display device 220 communicates with the processing device 105. The processing unit 102 and the processing device 105 connect with each other via a network. The processing device 105 is disposed on the outside of the imaging display device 220, and may be on a cloud, for example. In the imaging display device 220, not the processing unit 102 but the processing device 105 includes the AI unit 107. The processing unit 102 and the processing device 105 exchange information with each other, and generate pupil-based adjusted image information from image information and pupil information. In FIG. 5B, image information and pupil information respectively acquired by the imaging unit 101 and the pupil detection unit 104 are converted into pupil-based adjusted image information by the processing unit 102 that has obtained information from the processing device 105. In this manner, the imaging display device 220 can generate pupil-based adjusted image information using information accumulated in an external device.

FIG. 5C is a schematic diagram illustrating a modified example of the imaging display device 130 illustrated in FIG. 1C. The processing unit 102 of an imaging display device 230 communicates with the processing device 106, and the processing device 106 further communicates with another processing device 105. The processing device 106 includes the AI unit 107. The processing device 106 is on a cloud and performs data accumulation, for example. The processing device 105 is provided separately from the imaging display device 230 and the processing device 106. The processing unit 102 and the processing device 105 connect with each other via a network, and the processing device 106 and the processing device 105 connect with each other via a network. In FIG. 5C, the processing unit 102 receives setting information accumulated in the processing device 106, and generates pupil-based adjusted image information based on the setting information. The setting information includes basic information on an environment and a target object, and various values for generating pupil-based adjusted image information. The processing unit 102 also transmits a plurality of pieces of information including image information and pupil information from the imaging unit 101 and the pupil detection unit 104, to the processing device 106. The plurality of pieces of information is transmitted to the processing device 105 via the processing device 106. Based on the plurality of pieces of received information, the processing device 105 generates various values for generating pupil-based adjusted image information, and transmits the generated various values to the processing device 106. The processing device 106 updates basic information and various values that are accumulated therein, and holds the updated basic information and values as new information. In this manner, the imaging display device 230 can generate pupil-based adjusted image information using information accumulated in an external device.

In FIG. 5A, the processing unit 102 transmits pupil-based adjusted image information to the display unit 103 based on the image information and the pupil information respectively obtained by the imaging unit 101 and the pupil detection unit 104. The processing unit 102 can process not only the image information and the pupil information but also other types of information such as temperature humidity information, acceleration information, and pressure information. The processing unit 102 illustrated in FIG. 5B, and the processing unit 102, the processing device 105, and the processing device 106 that are illustrated in FIG. 5C are similar to the case illustrated in FIG. 5A.

In the case of using the imaging display device according to the present exemplary embodiment as a wearable device, a smaller processing data amount in a processing unit is more desirable. This is because it is necessary to make a wearable terminal lightweight and thin as far as possible, and a chip of a processing unit can be made smaller with decrease in a load on data processing. As a method of reducing a load of a data processing amount, for example, there is a method of performing AI processing in a separate device (cloud, etc.) as illustrated in FIGS. 5B and 5C. In addition, as a method of reducing a processing amount, there are a method of decreasing resolution of a portion other than a region of interest, a method of making a portion other than a region of interest a still image, and a method of performing not color processing but monochrome processing on a portion other than a region of interest.

In a fourth exemplary embodiment, adjustment including not only pupil information but also prediction is performed on image information obtained by image capturing by the imaging unit 101. In the adjustment including prediction, the processing unit 102 generates prediction image information that predicts future, from image information acquired by the imaging unit 101, simultaneously with pupil-based adjustment. The prediction image information is displayed on the display unit 103. A characteristic point of the processing unit 102 lies in that the processing unit 102 includes not only a function of performing pupil-based adjustment processing based on image information obtained by image capturing by the imaging unit 101 and information acquired by the pupil detection unit 104, but also a function of generating prediction image information that predicts future. With this configuration, not only pupil-based adjusted image information that is based on the position of a pupil is displayed, but also a temporal difference from when image information is acquired to when the image information is displayed, that is to say, latency can be reduced. Thus, for example, when the user performs an operation of catching a moving object, the user can desirably use the imaging display device. In this case, the processing unit 102 may include the AI unit 107 as illustrated in FIG. 5A. Furthermore, the AI unit 107 may perform adjustment for enhancing the performance of the imaging display device.

An operation of generating prediction image information that predicts future will be described with reference to FIGS. 6A and 6B. FIGS. 6A and 6B are diagrams illustrating an operation of the imaging display device according to the present exemplary embodiment, and are diagrams illustrating a relationship between image information on one frame at a certain time and prediction image information. In FIGS. 6A and 6B, image information at a time Tn is denoted by An, and a future image information (prediction image information) processed by the processing unit 102 is denoted by Bn.

An operation of the imaging display device according to the present exemplary embodiment will be described with reference to FIG. 6A. In this operation, the imaging unit 101 performs an image capturing operation of obtaining image information $A_{-2}$ at a time $T_{-2}$, image information $A_{-1}$ at a time $T_{-1}$, image information $A_0$ at a time $T_0$, and image information $A_{+1}$ at a time $T_{+1}$. Next, based on the pieces of input image information $A_{-1}$, $A_0$, and $A_{+1}$, the processing unit 102 generates pieces of prediction image information $B_0$, $B_{+1}$, and $B_{+2}$. Then, the processing unit 102 outputs the pieces of prediction image information $B_0$, $B_{+1}$, and $B_{+2}$ to the display unit 103. The display unit 103 performs a display operation of displaying an image that is based on the prediction image information $B_0$, at the time $T_0$, an image that is based on the prediction image information $B_{+1}$, at the time $T_{+1}$, and an image that is based on the prediction image information $B_{+2}$, at the time $T_{+2}$.

In other words, the imaging unit 101 performs an image capturing operation of obtaining the image information $A_{-1}$ at the certain time $T_{-1}$, and performs an image capturing operation of obtaining the image information $A_0$ that is different from the image information $A_{-1}$, at the time $T_0$ later than the certain time $T_{-1}$. At the time $T_0$, the display unit 103 performs a display operation of displaying an image corresponding to the prediction image information $B_0$ generated from the image information $A_{-1}$. Furthermore, at the time $T_{+1}$ later than the time $T_0$, the imaging unit 101 performs an image capturing operation of obtaining the image information $A_{+1}$ that is different from the image information $A_0$. Then, the display unit 103 performs a display operation of displaying an image corresponding to the prediction image information $B_{+1}$ generated from the image information $A_0$.

A display timing of prediction image information according to the present exemplary embodiment will be described. At a certain time, the processing unit 102 according to the present exemplary embodiment generates prediction image information in such a manner as to reduce a lag between image information obtained by performing image capturing by the imaging unit 101, and an image displayed by the display unit 103. It is desirable to set a display timing of the prediction image information in the following manner.

First of all, at an arbitrary time Tn, the imaging unit 101 captures an image. A time at which prediction image information at the time Tn is generated by the display unit 103 and an image that is based on the prediction image information at the time Tn is displayed by the display unit 103 is denoted by Tm. In this case, a difference ΔT between an image capturing timing and a display timing can be represented by (1):

$$\Delta T = Tn - Tm. \quad (1)$$

In this case, a display frame rate (frame per second (fps)) being the number of images to be displayed by the display unit 103 per second is denoted by DFR. The imaging display device is controlled in such a manner that the difference ΔT satisfies Inequality (2). More specifically, the imaging display device is controlled in such a manner that the difference ΔT satisfies Inequality (3).

$$-2/DFR \leq \Delta T \leq 2/DFR \quad (2)$$

$$-1/DFR \leq \Delta T \leq 1/DFR \quad (3)$$

For example, when a display frame rate is 240 (fps), a time taken for one image (one frame) from when the image is captured to when the image is displayed is about $4 \times 10^{-3}$ (seconds). Accordingly, the difference ΔT can be calculated as follows:

$$-4 \times 10^{-3} \leq \Delta T \leq 4 \times 10^{-3}. \quad (4)$$

By displaying, at such a timing, an image that is based on prediction image information, a moving image with a less lag between a real image and a displayed image can be displayed. The above-described moving image display can also be said to be real-time display. Accordingly, in the present exemplary embodiment, real-time display, strictly speaking, pseudo real-time display can be performed. While the present exemplary embodiment can also be applied to a still image, it is effective to perform the operation on a moving image.

Aside from displaying prediction image information at such a timing, such a time lag can also be utilized when prediction image information is generated. Image information obtained by image capturing by the imaging unit 101 at an arbitrary time is denoted by An. Image information displayed by the display unit 103 at the same time is denoted by Dn. In this case, a difference between the pieces of image information, that is to say, a temporal shift amount can be represented as ΔA=Dn−An. In the exemplary embodiment illustrated in FIG. 6A, Dn=Bn is obtained. In other words, a temporal difference between image information obtained by image capturing by the imaging unit 101 at a certain time, that is to say, a real event (real image) at the certain time and image information displayed by the display unit 103 satisfies $\pm 4 \times 10^{-3}$ (seconds). A temporal difference between pieces of image information being $\pm 4 \times 10^{-3}$ (seconds) means that an image displayed by the display unit 103 is an image delayed by $4 \times 10^{-3}$ (seconds) from a real image at the certain time or an image brought forward by $4 \times 10^{-3}$ (seconds). It is desirable that prediction image information is generated under such a condition. The comparison between the image information An and the image information Dn can be performed using RAW data of the image information An and the image information Dn, for example. Then, the image information Dn is obtained in a manner such that the image information Dn is within $\pm 4 \times 10^{-3}$ (seconds) when a root-mean-square of the difference is calculated. Using information regarding the difference, the processing unit 102 sets the following various parameters for generating prediction image information.

Especially in the case of performing additional image processing, a lag becomes $100 \times 10^{-3}$ (seconds). However, by generating prediction image information according to the present exemplary embodiment, an image without a temporal difference from a real image can be displayed.

Examples of the additional image processing include dark field of view image processing of increasing luminance of a dark image, enlargement image processing of displaying a small subject in an enlarged size, and temperature display processing of displaying temperature in an image. By the operation according to the present exemplary embodiment, real-time display can be performed even in a case where a time for performing such image processing is added.

Next, an operation in FIG. 6B will be described. In this operation, the imaging unit 101 performs an image capturing operation of obtaining image information $A_{-2}$ at a time $T_{-2}$, image information $A_{-1}$ at a time $T_{-1}$, image information $A_0$ at a time $T_0$, and image information $A_{+1}$ at a time $T_{+1}$. Next, based on the pieces of input image information $A_{-1}$, $A_0$, and $A_{+1}$, the processing unit 102 generates pieces of prediction image information $B_{+1}$, $B_{+2}$, and $B_{+3}$. Then, the processing unit 102 outputs the pieces of prediction image information $B_{+1}$, $B_{+2}$, and $B_{+3}$ to the display unit 103. The display unit 103 performs a display operation of displaying an image that is based on the prediction image information $B_{+1}$, at the time $T_0$, an image that is based on the prediction image information $B_{+2}$, at the time $T_{+1}$, and an image that is based on the prediction image information $B_{+3}$, at the time $T_{+2}$. In other words, image information to be obtained by performing image capturing at a time $T_{+1}$ is predicted and displayed at the time $T_0$. In this manner, information at a time forward of an image capturing time can be displayed at the image capturing time. By continuously repeating the operation, an image forward of a real image can be continuously displayed. That is to say, an image can be displayed as a video.

Source image information on prediction image information will be described. For example, in the description of FIG. 6A, the prediction image information $B_0$ is generated based on the image information $A_{-1}$. In the description of FIG. 6B, the prediction image information $B_{+1}$ is generated based on the image information $A_{-1}$. In other words, one piece of prediction image information is generated based on one piece of image information. Alternatively, one piece of prediction image information may be generated based on two or more pieces of image information. For example, in FIG. 6A, the prediction image information $B_0$ may be generated based on the pieces of image information $A_{-2}$ and $A_{-1}$. In FIG. 6B, the prediction image information $B_{+1}$ may be generated based on the pieces of image information $A_{-2}$ and $A_{-1}$. Accordingly, prediction image information can be generated using at least one piece of image information.

A frame rate in the present exemplary embodiment will be described. First of all, the number of pieces of image information to be acquired by the imaging unit 101 per second will be referred to as an image capturing frame rate SFR (fps). In addition, as described above, the number of pieces of image information to be displayed by the display unit 103 per second will be referred to as a display frame rate DFR (fps). In this case, a relationship between frame rates in FIGS. 6A and 6B in the present exemplary embodiment is represented as SFR=DFR. Alternatively, an image capturing frame rate and a display frame rate may be different. In particular, it is desirable that SFR≥DFR is obtained. This is because prediction image information can be generated from a plurality of pieces of image information obtained by image capturing.

By the imaging display device according to the present exemplary embodiment, it is possible to provide an imaging display device with which uncomfortable feeling for the user is reduced.

Figure 7A:
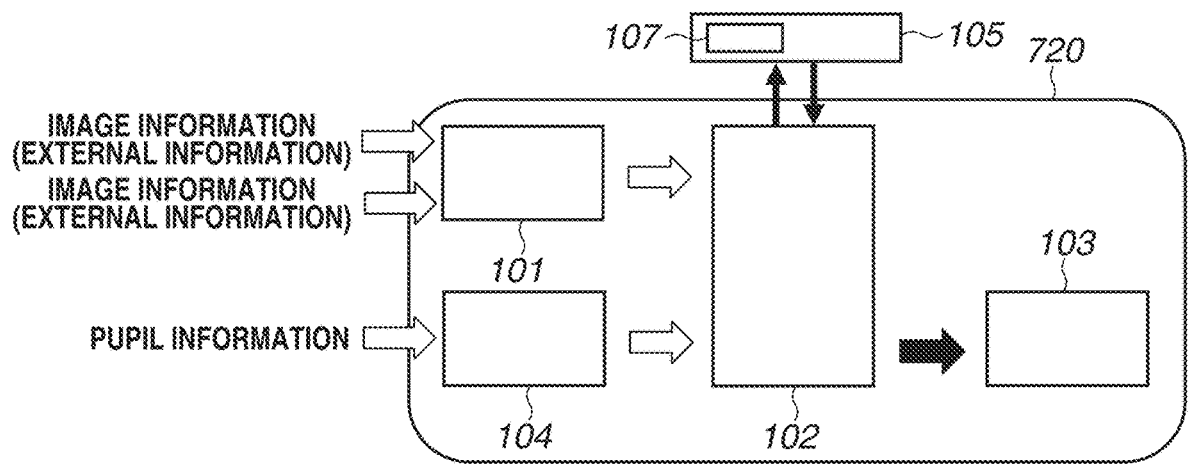
FIGS. 7A and 7B are schematic diagrams illustrating an imaging display device according to a fifth exemplary embodiment.
Figure 7B:
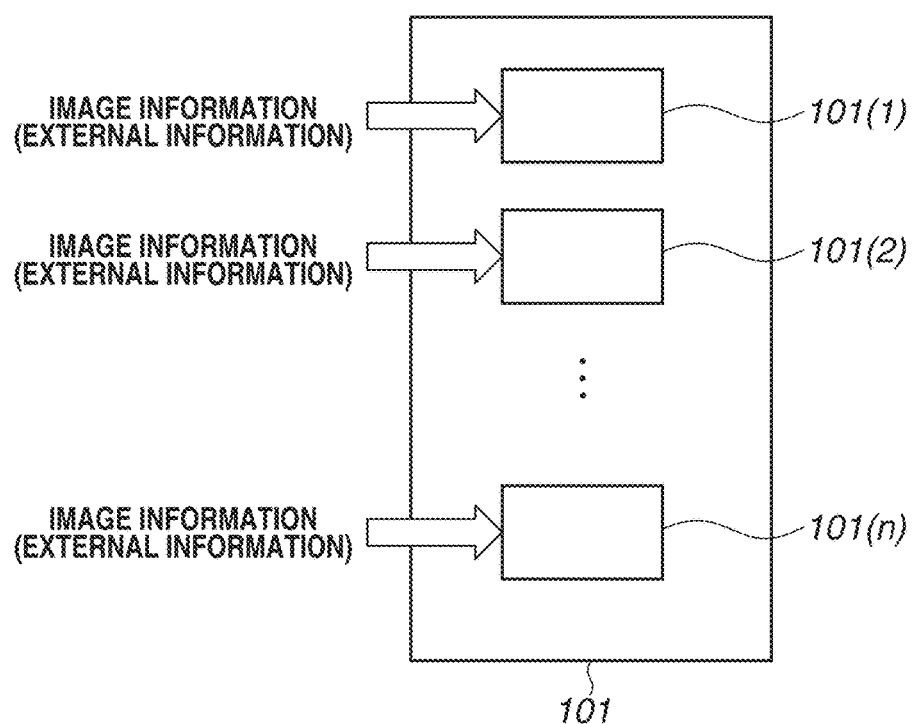

An imaging display device according to a fifth exemplary embodiment will be described with reference to FIGS. 7A, 7B, 8A, 8B, and 8C. FIG. 7A illustrates an imaging display device 720 corresponding to FIG. 1B. FIG. 7B is a block diagram illustrating the imaging unit 101. In the present exemplary embodiment, the imaging unit 101 includes n (n is a natural number) imaging units 101 (1) to 101 (n). The pupil detection unit 104 can detect a pupil including line of sight information. The pupil detection unit 104 may acquire an image information including line of sight information. The processing unit 102 can acquire line of sight information detected by the pupil detection unit 104, and change operations of the plurality of imaging units 101. Examples of the plurality of imaging units 101 include an imaging apparatus including a photodiode as described in the first exemplary embodiment. Alternatively, the plurality of imaging units 101 may be a photon counting sensor, such as a single-photon avalanche diode (SPAD). The SPAD is an imaging apparatus including an avalanche diode. In this case, clear image information can be displayed even under an environment with low luminance.

Figure 8A:
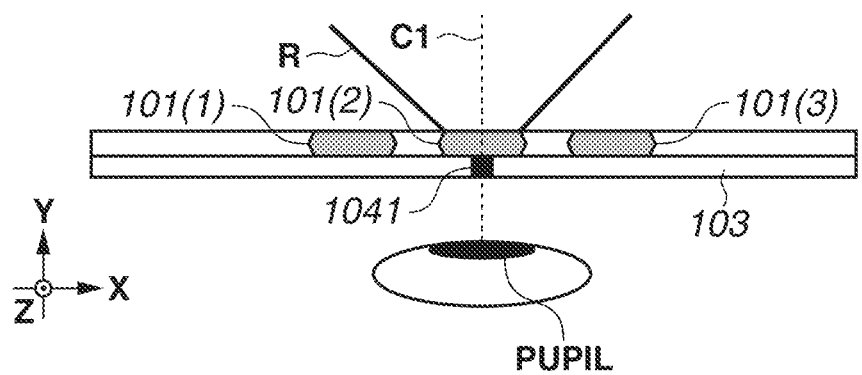
FIGS. 8A, 8B, and 8C are schematic diagrams illustrating the imaging display device according to the fifth exemplary embodiment.
Figure 8B:
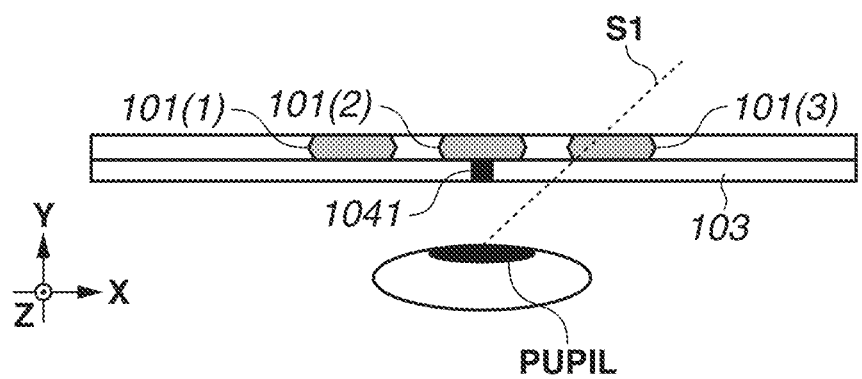

FIG. 8A is a cross-sectional schematic view of the imaging display device 720 according to the present exemplary embodiment. The imaging display device 720 includes a plurality of imaging units 101. In FIG. 8A, the imaging display device 720 includes three imaging units 101 (1) to 101 (3). The pupil detection unit 104 detects a line of sight. When a line of sight exists near the imaging unit 101 (2), the processing unit 102 can perform the following operation: the processing unit 102 generates pupil-based adjusted image information using only image information acquired by the imaging unit 101 (2) among the plurality of imaging units 101. The processing unit 102 does not use image information acquired by the other imaging units 101 (1) and 101 (3). Alternatively, the processing unit 102 can generate pupil-based adjusted image information using all image information acquired by the imaging unit 101 (2), and using image information acquired by the other imaging units 101 (1) and 101 (3) with a reduced information amount. As a reduction method of an information amount of image information, there are a method of using only luminance information, a method of decreasing the resolution of an image by thinning out pixels, and a method of using an average value or a median value of a plurality of pixels. Furthermore, as a reduction method, a method of using a reduced number of output bits from an imaging unit of a pixel signal value, and a method of using only information to be used for distance measurement or focusing can also be used. The reduction of an information amount of image information may be performed in the imaging unit 101 or may be performed by the processing unit 102. When the processing unit 102 uses only image information acquired by the imaging unit 101 (2) existing near a line of sight, the other imaging units 101 (1) and 101 (3) may be shifted to a power saving state by changing the imaging units 101 (1) and 101 (3) into a sleep mode or stopping power supply to the imaging units 101 (1) and 101 (3). These types of control can be performed by the processing unit 102. FIG. 8B illustrates a state in which the line of sight S1 moves to the imaging unit 101 (3). According to a position of the line of sight, the processing unit 102 uses image information acquired by the imaging unit 101 (3).

Figure 8C:
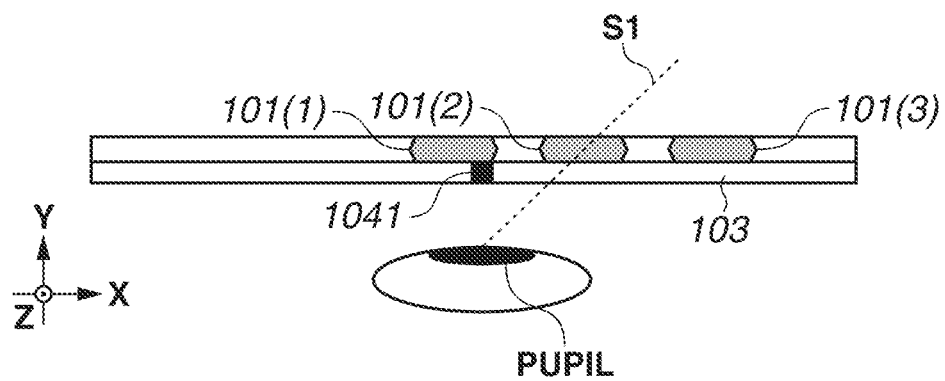

FIG. 8C illustrates a modified example of FIG. 8A. In FIG. 8C, the imaging unit 101 can move to a desired position based on line of sight information detected by the pupil detection unit 104. In FIG. 8C, a plurality of image sensors is arranged as the imaging units 101. Among these image sensors, the imaging unit 101 (2) is arranged on a line of sight S1. When the line of sight moves, the pupil detection unit 104 detects the movement and the imaging unit 101 moves in such a manner that the imaging unit 101 (2) is arranged on the line of sight. The movement can be performed by a power unit disposed in a casing of the imaging display device. With this configuration, as compared with the case illustrated in FIG. 8A, while the imaging unit 101 is moved, an operation of switching roles of a plurality of image sensors is unnecessary. Furthermore, since a positional relationship between a line of sight and each imaging unit is defined to one, a load on subsequent image processing can be reduced.

In the imaging display device according to the present exemplary embodiment, when a surface on which a plurality of imaging units 101 is arranged is curved, vector information between a pupil and the imaging unit 101 is fixed, and therefore a load on subsequent image processing can be further reduced, which is more desirable.

An imaging display device according to a sixth exemplary embodiment can display an image that uses light other than visible light (near-infrared light, infrared light, ultraviolet light, etc.). For example, the imaging unit 101 includes a photoelectric conversion element that can detect a visible light region, and a photoelectric conversion element that can detect light in a waveband other than the visible light region. For example, the imaging unit 101 includes at least two imaging apparatuses. One of the imaging apparatuses is an imaging apparatus equipped with a photoelectric conversion element for visible light, and the other one imaging apparatus is an imaging apparatus equipped with a photoelectric conversion element for light other than visible light. Alternatively, the imaging unit 101 includes one imaging apparatus. The one imaging apparatus may include at least one photoelectric conversion element for visible light, and at least one photoelectric conversion element for light other than visible light.

By such an imaging unit 101, in addition to image information in a visible light region, an image signal in a region other than the visible light region including a near-infrared light region can also be acquired. Using these pieces of image information, the processing unit 102 generates pupil-based adjusted image information in one visible light region. More specifically, the processing unit 102 generates pupil-based adjusted image information by adjusting image information using pupil information and information in the near-infrared light region. With this configuration, even in a situation in which sensitivity of a visible light region is low, an image with enhanced sensitivity is displayed. In other words, according to the imaging display device according to the present exemplary embodiment, an image invisible to human eyes can also be displayed. Such an imaging display device according to the present exemplary embodiment can also be applied to a night vision device, a surveillance device, binocular glasses, a telescope, and a medical detection device, for example.

Figure 9A:
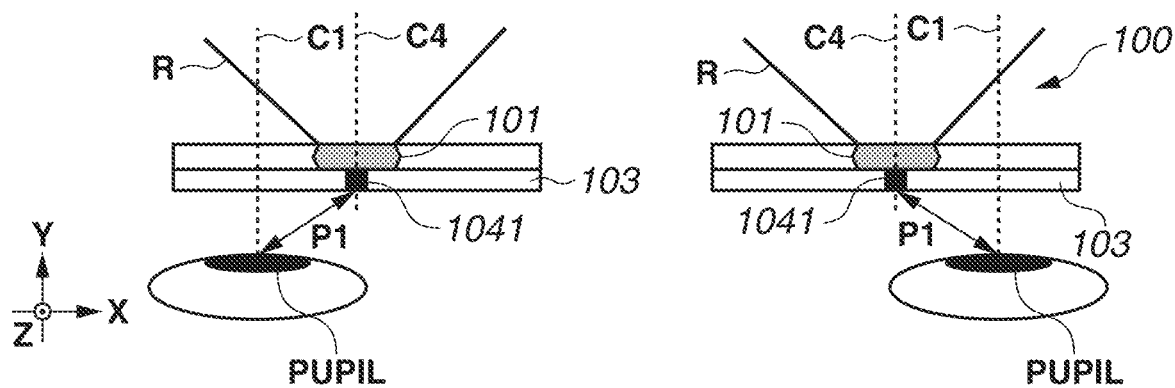
FIGS. 9A and 9B are schematic diagrams illustrating an imaging display device according to a seventh exemplary embodiment.
Figure 9B:
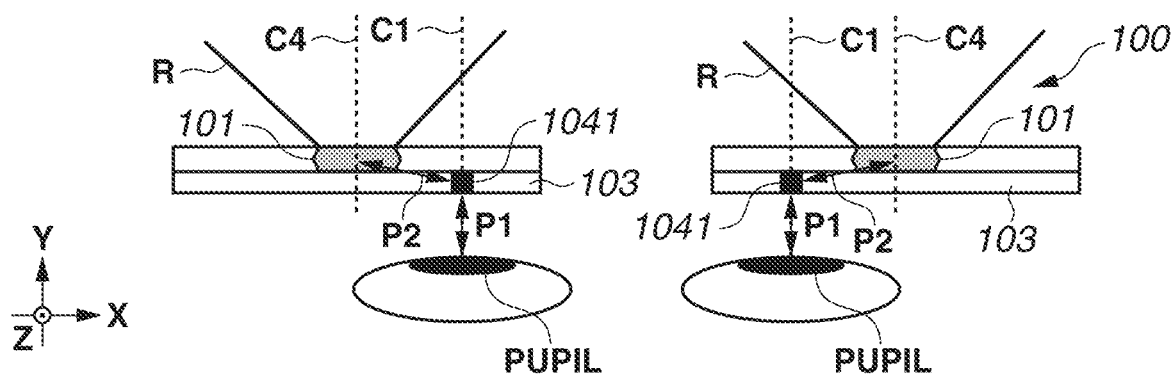

An imaging display device according to a seventh exemplary embodiment will be described with reference to FIGS. 9A and 9B. FIGS. 9A and 9B are schematic diagrams illustrating the imaging display device 100 that correspond to FIGS. 2A, 2B, 2C, and 2D. In FIGS. 2A, 2B, 2C, and 2D, the central axis C1 of the pupil and the center of the display unit 103 coincide with each other. In the present exemplary embodiment, the description will be given of a case where the central axis C1 of the pupil and a central axis C4 of the display unit 103 do not coincide with each other. Since the other configurations in FIGS. 9A and 9B are similar to those in FIGS. 2A, 2B, 2C, and 2D, the detailed description will be omitted.

In FIG. 9A, the central axis C4 of the display unit 103 is arranged at a distance from the central axis C1 of the pupil by a predetermined distance in the X direction. The imaging unit 101 and the pupil detection unit 1041 are arranged on the central axis C4 of the display unit 103. The pupil detection unit 1041 acquires the vector information P1 between the pupil and the pupil detection unit 104. Based on the vector information P1, image information acquired by the imaging unit 101 is adjusted together with the positions of the display unit 103 and the pupil. By using such pupil-based adjusted image information, the display unit 103 can display an image of which the center position is changed in accordance with the position of the pupil. By the above-described processing, a difference from a real image can be further reduced.

In FIG. 9B, similarly to FIG. 9A, the central axis C4 of the display unit 103 is arranged at a distance from the central axis C1 of the pupil by a predetermined distance in the X direction. The imaging unit 101 is arranged on the central axis C4 of the display unit 103. The pupil detection unit 1041 is arranged on the central axis C1 of the pupil. The pupil detection unit 1041 acquires the vector information P1 between the pupil and the pupil detection unit 104. In addition, the processing unit 102 holds the vector information P2 between the pupil detection unit 1041 and the imaging unit 101. Image information acquired by the imaging unit 101 is adjusted using the vector information P1 and the vector information P2. By using such pupil-based adjusted image information, the display unit 103 can display an image of which the center position is changed in accordance with the position of the pupil. By the above-described processing, a difference from a real image can be further reduced.

An example of applying the imaging display device according to each exemplary embodiment to a wearable device will be described with reference to FIG. 10. The imaging display device can be applied to a wearable device such as smart glasses, a head mounted display (HMD), and smart contact lenses, for example.

Figure 10:
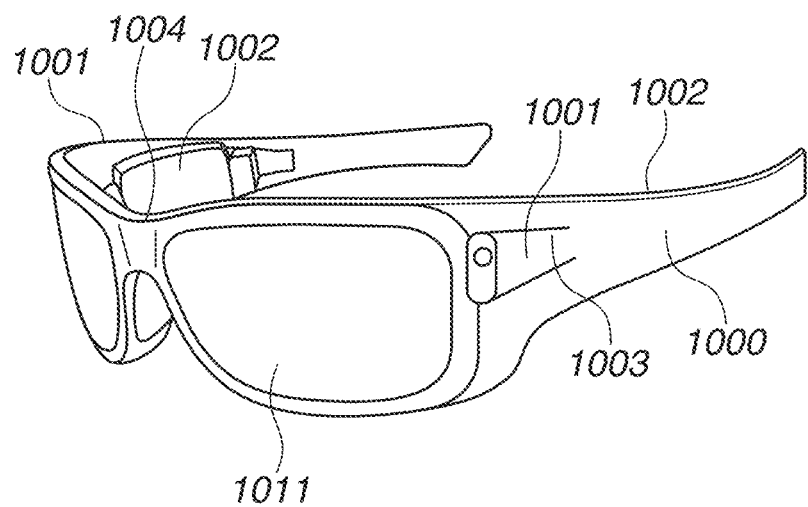
FIG. 10 is a schematic diagram illustrating a wearable device.

FIG. 10 is a schematic diagram illustrating smart glasses 1000. The smart glasses 1000 will also be referred to as an eyewear-shaped imaging display device or glasses. The smart glasses 1000 include an eyewear-shaped casing. The casing will also be referred to as a frame. The frame is provided with the imaging display device according to each exemplary embodiment. Specifically, the smart glasses 1000 at least include an imaging unit 1001, a processing unit 1002, a display unit 1003, and a pupil detection unit 1004. Two imaging units 1001 are provided on the frame side surfaces of the glasses. Alternatively, the imaging units 1001 may be provided on lenses. The processing units 1002 are stored in temples of the glasses. The display unit 1003 is provided at an arbitrary position depending on the display format, and may be included in lenses 1011. In any case, the display unit 1003 displays an image on the lenses 1011. The pupil detection unit 1004 is stored on the pupil side at the center of the two glasses lenses, and may be provided on the lens or the frame side surface. The processing unit 1002 may include an AI unit. The smart glasses 1000 may include an external interface and the processing unit 1002 may communicate with an external AI unit. The frame may include a power source unit and may include an interface unit for performing wireless connection with the outside.

The smart glasses 1000 illustrated in FIG. 10 may include two imaging display devices for a left eye and a right eye. In this case, in the imaging display devices for the left eye and the right eye, an image capturing timing and a display timing can be arbitrarily set. Specifically, an operation of performing image capturing at the same time and displaying an image at a different time, or an operation of performing image capturing at a different time and displaying an image at the same time can be performed.

The imaging unit 1001 and the display unit 1003 may be disposed at different positions as illustrated in FIG. 10. Alternatively, the imaging unit 1001, the display unit 1003, and the pupil detection unit 1004 may be stacked on a line of sight.

Figure 11A:
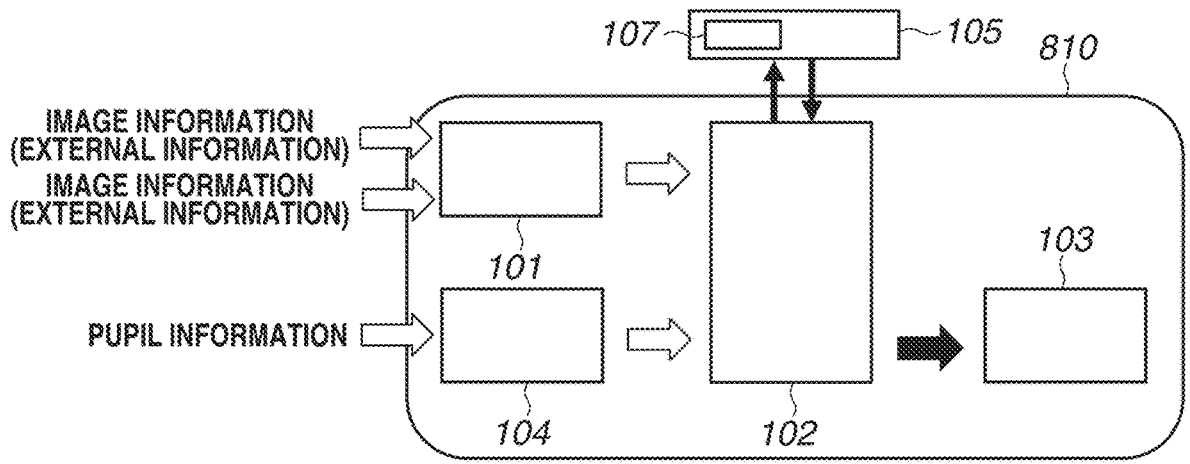
FIGS. 11A, 11B, and 11C are schematic diagrams illustrating an imaging display device according to a ninth exemplary embodiment.

An imaging display device according to a ninth exemplary embodiment will be described with reference to FIGS. 11A, 11B, and 11C. FIG. 11A is a schematic diagram illustrating an imaging display device 810 according to the present exemplary embodiment. FIG. 11A is a schematic diagram corresponding to FIG. 7A. In FIG. 11A, the same configurations as those in the other exemplary embodiments are assigned the same reference numerals and the redundant description will be omitted. In addition, the description of configurations and operations that are similar to those in the other exemplary embodiments will be omitted. In the present exemplary embodiment, the description will be given of a technique that can reduce a difference between a real event and an image displayed on an imaging display device, by factoring in a positional relationship between an imaging unit and a pupil.

In FIG. 11A, the pupil detection unit 104 can acquire a pupil including line of sight information, as image information. The processing unit 102 can acquire line of sight information detected by the pupil detection unit 104, set a weight to a plurality of imaging units 101, and generate one piece of image information. Specifically, based on the line of sight information detected by the pupil detection unit 104, an imaging unit 101 serving as a main imaging unit can be set from among a plurality of imaging units 101, and one piece of image information can be generated in a manner such that image information acquired by the main imaging unit 101 is interpolated using image information acquired by an imaging unit 101 other than the main imaging unit 101. Thus, an image including a positional relationship between an imaging unit and a pupil can be generated. A difference between a displayed image and a real event can be therefore reduced. By the technique according to the present exemplary embodiment, wide-range external information can be displayed on a display unit. The wide range includes a field angle and a distance.

An operation according to the present exemplary embodiment will be described with reference to FIGS. 11B and 11C. FIG. 11C is a cross-sectional schematic view of the imaging display device 810. The imaging display device 810 includes a plurality of imaging units 101. Each of the imaging units 101 can be an image sensor including a photodiode, for example. The imaging display device 810 includes at least two imaging units. Specifically, the imaging display device 810 includes an imaging unit 101 (4) and an imaging unit 101 (5). The pupil detection unit 104 detects a line of sight.

Figure 11B:
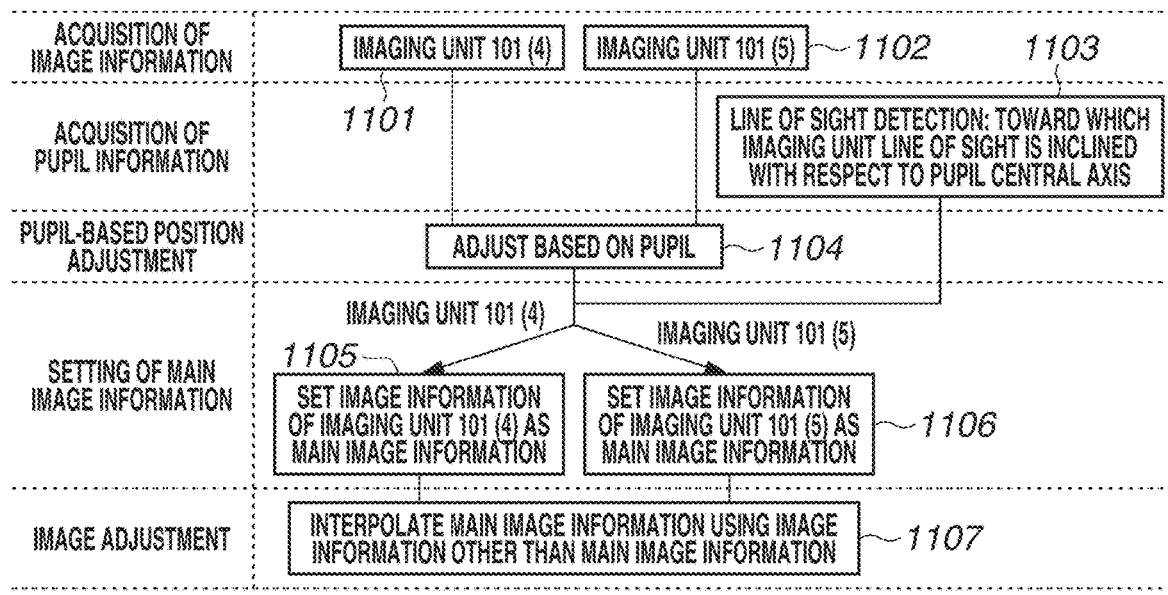
Figure 11C:
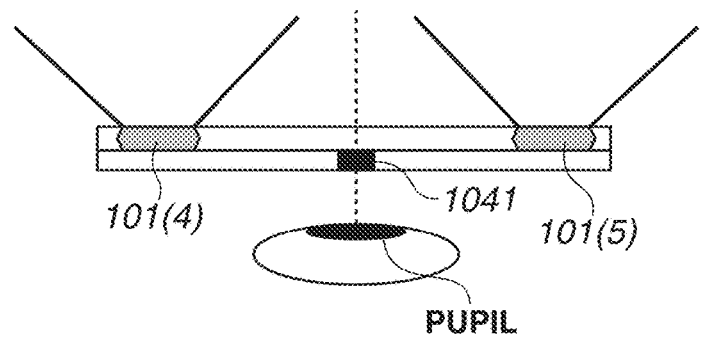

FIG. 11B is an operation flow diagram of the imaging display device 810. First of all, the imaging unit 101 (4) and the imaging unit 101 (5) each acquire image information in steps 1101, 1102 and 1103. The pupil detection unit 104 detects the position of a pupil and pupil information. As pupil information, line of sight information is included. For example, the pupil detection unit 104 detects toward which imaging unit a line of sight is inclined with respect to a pupil central axis. When the line of sight is inclined toward the imaging unit 101 (4) with respect to the pupil central axis, the processing unit 102 performs the following operation.

First of all, the processing unit 102 generates pupil-based adjusted image information from image information acquired by a plurality of imaging units 101. Based on line of sight information, the processing unit 102 sets, as main image information, image information acquired by the imaging unit 101 (4) among the plurality of imaging units in step 1105 or 1106. The processing unit 102 generates one piece of image information in a manner such that the main image information is interpolated using image information acquired by the imaging unit 101 (5) other than the main imaging unit 101 (4) in step 1107. The processing unit 102 sets the one piece of image information to the imaging units 101 (4) and 101 (5). By such processing, a natural display image in which a positional relationship between an imaging unit and a pupil, for example, a positional relationship between an imaging unit and a line of sight, is factored in can be generated. A difference between a real event and an image displayed on an imaging display device can be therefore reduced. In addition, by an AI unit disposed in the processing unit 102 and using deep learning, accuracy and a processing speed in generating one piece of image information from a plurality of pieces of image information can be increased.

In the present exemplary embodiment, the description has been given of processing performed after image information is acquired from the imaging unit 101 (4) and the imaging unit 101 (5). Alternatively, after a line of sight is detected, the imaging unit 101 (4) serving as a main imaging unit may be selected and the imaging unit 101 (5) serving as a sub imaging unit may be selected. Then, the main imaging unit 101 (4) and the sub imaging unit 101 (5) may acquire image information, and the processing unit 102 may perform the above-described processing.

Figure 12:
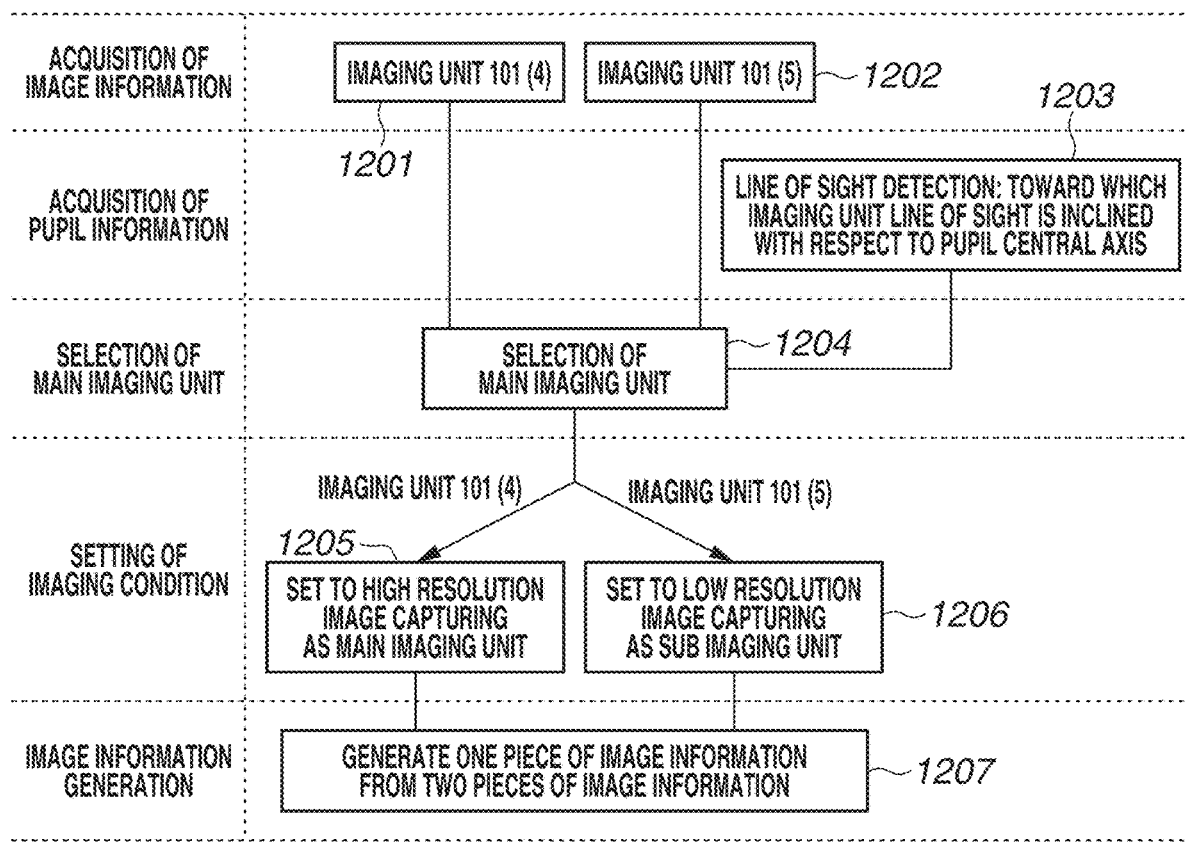
FIG. 12 is a schematic diagram illustrating the imaging display device according to the ninth exemplary embodiment.

Another operation as illustrated in FIG. 12 may be performed. FIG. 12 is another operation flow diagram according to the present exemplary embodiment that corresponds to FIG. 11B. The pupil detection unit 104 detects a line of sight in step 1203. After a line of sight is detected, the imaging unit 101 (4) serving as a main imaging unit and the imaging unit 101 (5) serving as a sub imaging unit are selected in accordance with the position of the line of sight in step 1204. Next, an imaging condition of each imaging unit is set in steps 1205 and 1206. For example, the imaging unit 101 (4) is set to high resolution image capturing as a main imaging unit, and the imaging unit 101 (5) is set to low resolution image capturing as a sub imaging unit. After that, in step 1207, one piece of image information from two pieces of image information is generated, whereby a display image factoring in a positional relationship between an imaging unit and a line of sight can be generated.

Figure 13A:
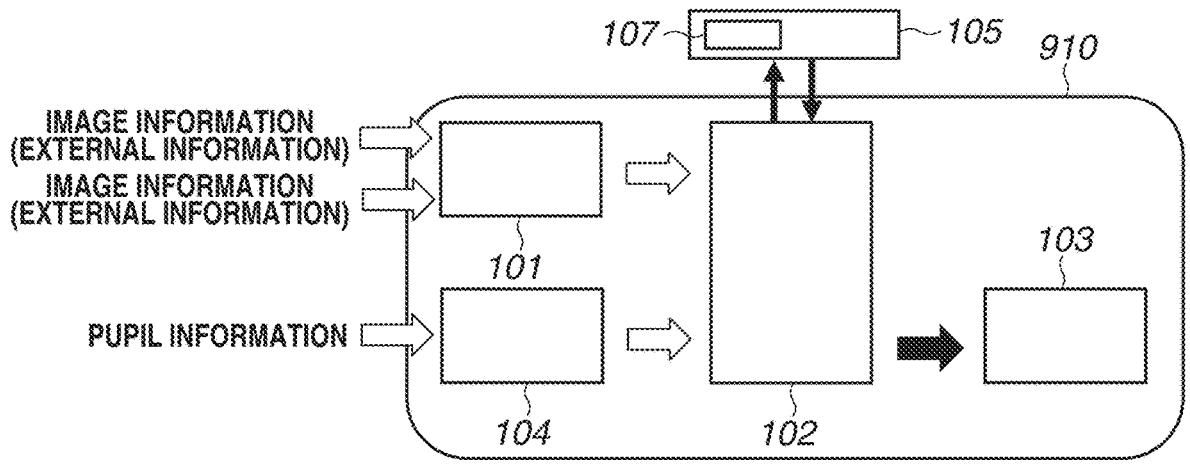
FIGS. 13A, 13B, and 13C are schematic diagrams illustrating an imaging display device according to a tenth exemplary embodiment 0.

An imaging display device according to a tenth exemplary embodiment will be described with reference to FIGS. 13A, 13B, and 13C. FIG. 13A is a schematic diagram illustrating an imaging display device 910 according to the present exemplary embodiment. FIG. 13A is a schematic diagram corresponding to FIG. 7A. In FIG. 13A, the same configurations as those in the other exemplary embodiments are assigned the same reference numerals and the redundant description will be omitted. In addition, the description of configurations and operations that are similar to those in the other exemplary embodiments will be omitted. In the present exemplary embodiment, the description will be given of a technique by which a difference between a real event and an image displayed on an imaging display device can be reduced by factoring in a positional relationship between an imaging unit and a pupil.

In FIG. 13A, the pupil detection unit 104 can detect a pupil including line of sight information, as image information. The processing unit 102 can acquire line of sight information detected by the pupil detection unit 104, set a weight to a plurality of imaging units 101, and generate one piece of image information. Specifically, the processing unit 102 sets a line of sight region from the line of sight information detected by the pupil detection unit 104. Based on the line of sight region, from among the plurality of imaging units 101, the processing unit 102 selects an imaging unit 101 for creating image information corresponding to the line of sight region, and another imaging unit 101 that can acquire widest-range external information. Then, the processing unit 102 generates at least these pieces of image information as one piece of image information. By using the imaging display device 910, at least one type of display can be performed. As one type of display, wide-range external information can be displayed on a display unit. As another type of display, the line of sight region can be displayed at high resolution and other regions can be displayed at low resolution. By the imaging display device 910, a natural display image can be displayed and a load on image processing can also be reduced.

An operation according to the present exemplary embodiment will be described with reference to FIGS. 13B and 13C. FIG. 13C is a cross-sectional schematic view of the imaging display device 910 according to the present exemplary embodiment. The imaging display device 910 includes a plurality of imaging units 101. Each of the imaging units 101 can be an image sensor including a photodiode, for example. The imaging display device 910 includes at least two imaging units. Specifically, the imaging display device 910 includes an imaging unit 101 (6) and an imaging unit 101 (7). The pupil detection unit 104 detects a line of sight region.

Figure 13B:
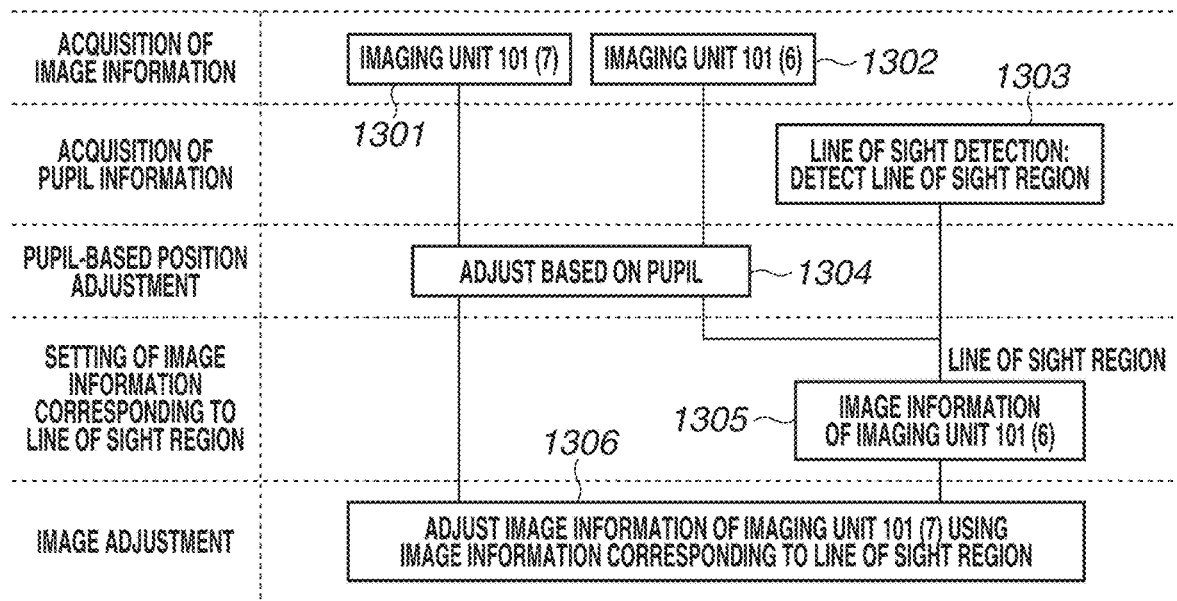
Figure 13C:
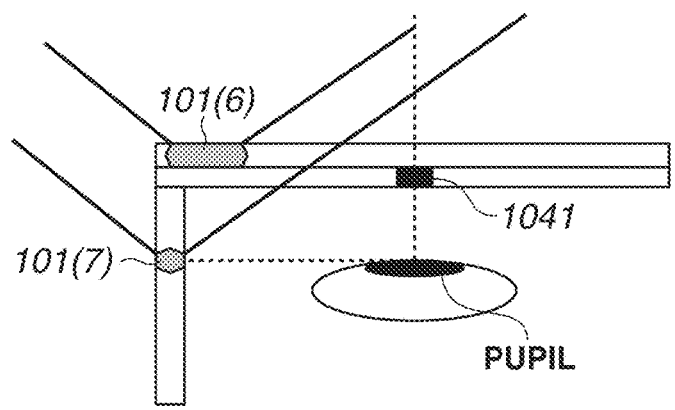

FIG. 13B is an operation flow diagram of the imaging display device 910 according to the present exemplary embodiment. First of all, the imaging unit 101 (6) and the imaging unit 101 (7) each acquire image information in steps 1301 and 1302. The pupil detection unit 104 detects a line of sight region in step 1303. The line of sight region means a region to which a line of sight is oriented. In this case, the line of sight is oriented toward the imaging unit 101 (6). Based on the obtained line of sight region, the processing unit 102 performs the following operation.

The processing unit 102 generates pupil-based adjusted image information from image information acquired by the plurality of imaging units 101 in step 1304. In addition, the processing unit 102 extracts image information corresponding to the line of sight region, from the image information acquired by the imaging unit 101 (6) and the line of sight information acquired by the pupil detection unit 104 in step 1305. Meanwhile, the processing unit 102 generates one piece of image information by combining the image information acquired by the imaging unit 101 (7) with the image information corresponding to the line of sight region that has been extracted from information from the imaging unit 101 (6) in step 1306. By such processing, a display image factoring in a line of sight can be generated. A difference between a real event and an image displayed on an imaging display device can be therefore reduced. In addition, by an AI unit disposed in the processing unit 102 and using deep learning, accuracy and a processing speed in generating one piece of image information from a plurality of pieces of image information can be increased. In the present exemplary embodiment, after an imaging unit is selected as illustrated in FIG. 12, image information may be acquired.

According to each of the above-described exemplary embodiments, it is possible to obtain an imaging display device that reduces a difference between a displayed image and a real event.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

In one embodiment, the processing units 102 and 1002, and the processing devices 105 and 106 may be hardware circuits with specialized circuit elements to perform the operations described above (or below if this paragraph is placed at the beginning). These circuits may be programmable logic devices (PLDs) or field programmable gate arrays (FPGAs), or applications-specific integrated circuits (ASICs), or similar devices. Alternatively, they may be programmable processors or devices such as a central processing unit (CPU) to execute a program, instructions stored in memory devices to perform operations described above (or below if this paragraph is placed at the beginning).

What is claimed is:

1. A device comprising:
   a first photoelectric conversion unit including a plurality of first photoelectric conversion elements, and configured to acquire first image information;
   a second photoelectric conversion unit including a plurality of second photoelectric conversion elements, and configured to acquire second image information;
   a first pupil detection unit configured to acquire first pupil information of a pupil of a user; and
   a processing unit configured to generate third image information by processing at least one of the first image information and the second image information, based on the first pupil information,
   wherein based on the first pupil information, the processing unit performs at least one of (i) activating the first photoelectric conversion unit and the second photoelectric conversion unit, and generating the third image information by processing the first image information, the second image information, or both the first image information and the second image information, and (ii) activating the first photoelectric conversion unit, and generating the third image information by processing the first image information.

2. The device according to claim 1, wherein based on the first pupil information, the processing unit performs both (iii) activating the first photoelectric conversion unit or the second photoelectric conversion unit, and (iv) activating the first photoelectric conversion unit, and generating the third image information by processing the first image information.

3. The device according to claim 1, further comprising a third photoelectric conversion unit including a plurality of third photoelectric conversion elements, and configured to acquire fourth image information,
   wherein based on the first pupil information, the processing unit performs at least one of (v) activating the first photoelectric conversion unit, the second photoelectric conversion unit, and the third photoelectric conversion unit, and generating the third image information by processing at least one of the first image information, the second image information, and the fourth image information, and (vi) activating the third photoelectric conversion unit, and generating the third image information by processing the fourth image information.

4. The device according to claim 1, wherein, when processing the first image information, the processing unit sets a region of interest in the first image information in accordance with the first pupil information, and performs processing of increasing resolution of the region of interest.

5. The device according to claim 1, wherein the first photoelectric conversion unit includes a backside illumination complementary metal-oxide semiconductor (CMOS) image sensor.

6. The device according to claim 1, wherein the first photoelectric conversion unit includes a photon counting sensor.

7. The device according to claim 1,
   wherein the plurality of first photoelectric conversion elements of the first photoelectric conversion unit is configured to detect light in a visible light region and a near-infrared light region, and
   wherein the processing unit performs processing of converting information in the near-infrared light region that is included in the first image information into information in the visible light region.

8. The device according to claim 1, further comprising a first display unit configured to display a first image that is based on the third image information.

9. The device according to claim 8, wherein the first display unit includes a plurality of organic light emitting diodes.

10. The device according to claim 8,
    wherein the processing unit generates first positional information between the first display unit and the pupil based on the first pupil information, and
    wherein a center of the first image is adjusted in accordance with positions of the pupil based on the first positional information.

11. The device according to claim 8, wherein at least three chips including a first chip on which the first photoelectric conversion unit is disposed, a second chip on which the first display unit is disposed, and a third chip on which the first pupil detection unit is disposed are stacked.

12. The device according to claim 8, further comprising
    a fourth photoelectric conversion unit including a plurality of fourth photoelectric conversion elements, and configured to acquire fifth image information;
    a second pupil detection unit configured to acquire second pupil information of another pupil of the user; and
    a second display unit configured to display a second image that is based on the third image information,
    wherein the processing unit generates positional information between the first and second display units and the pupils based on the first pupil information and the second pupil information, and wherein a center of the first image is adjusted in accordance with positions of the pupils based on the positional information.

13. The device according to claim 1,
wherein the first photoelectric conversion unit includes a first substrate on which the plurality of first photoelectric conversion elements is disposed, and a second substrate on which a circuit configured to process a signal from the plurality of first photoelectric conversion elements is disposed, and
wherein the first substrate and the second substrate are stacked.

14. The device according to claim 1,
wherein the first photoelectric conversion unit acquires sixth image information at a first time, and
wherein, based on the sixth image information, the processing unit generates first prediction image information at a second time later than the first time as the third image information.

15. The device according to claim 14, wherein the processing unit includes an artificial intelligence (AI) unit.

16. The device according to claim 15, wherein the AI unit includes a deep learning function.

17. A wearable device comprising:
the device according to claim 1; and
a power source unit configured to supply power to the device.

18. The wearable device according to claim 17, further comprising an interface unit configured to perform wireless connection with an outside.

19. The device according to claim 1, wherein the processing unit interrupts operation of either one of the first imaging unit and the second imaging unit based on the first pupil information, and uses image information from the other of the first imaging unit and the second imaging unit.

20. The device according to claim 1, wherein in a case where the processing unit performs (ii), the processing unit deactivates the second photoelectric conversion unit.

21. The device according to claim 20, wherein when the processing unit deactivates the second photoelectric conversion unit, the second photoelectric conversion unit is in a power saving state.

22. A device comprising:
a first photoelectric conversion unit including a plurality of first photoelectric conversion elements, and configured to acquire first image information;
a second photoelectric conversion unit including a plurality of second photoelectric conversion elements, and configured to acquire second image information;
a third photoelectric conversion unit including a plurality of third photoelectric conversion elements, and configured to acquire third image information;
a fourth photoelectric conversion unit including a plurality of fourth photoelectric conversion elements, and configured to acquire fourth image information;
a first pupil detection unit configured to acquire first pupil information of a user;
a second pupil detection unit configured to acquire second pupil information of another pupil of the user;
a processing unit configured to generate fifth image information by processing at least one of the first image information, the second image information, the third image information, and the fourth second image information based on the first pupil information and the second pupil information, a first display unit configured to display a first image that is based on the fifth image information; and
a second display unit configured to display a second image that is based on the fifth image information,
wherein based on the first pupil information and the second pupil information, the processing unit performs at least one of (i) activating the first to fourth photoelectric conversion units, and generating the fifth image information by processing at least one of the first to fourth image information, and (ii) activating the first photoelectric conversion unit and the third photoelectric conversion unit, and generating the fifth image information by processing the first image information and the third image information.

23. The device according to claim 22,
wherein the first photoelectric conversion unit, the second photoelectric conversion unit, the first pupil detection unit, and the first display unit are arranged corresponding to the pupil, and
wherein the third photoelectric conversion unit, the fourth photoelectric conversion unit, the second pupil detection unit, and the second display unit are arranged corresponding to the other pupil.

24. A wearable device comprising:
the device according to claim 22; and
a power source unit configured to supply power to the device.

25. The wearable device according to claim 24, further comprising an interface unit configured to perform wireless connection with an outside.

26. The device according to claim 22, wherein the processing unit interrupts operation of either one of the first imaging unit and the second imaging unit based on the first pupil information, and uses image information from the other of the first imaging unit and the second imaging unit.

27. The device according to claim 22, wherein in a case where the processing unit performs (ii), the processing unit deactivates the second photoelectric conversion unit and the fourth photoelectric conversion unit.

28. The device according to claim 27, wherein when the processing unit deactivates the second photoelectric conversion unit and the fourth photoelectric conversion unit, the second photoelectric conversion unit and the fourth photoelectric conversion unit are in a power saving state.

29. A device comprising:
a first photoelectric conversion unit including a plurality of first photoelectric conversion elements, and configured to acquire first image information;
a second photoelectric conversion unit including a plurality of second photoelectric conversion elements, and configured to acquire second image information;
a first detection unit configured to acquire a line of sights of a user; and
a processing unit configured to generate third image information by processing at least one of the first image information and the second image information, based on the line of sight,
wherein based on the line of sight, the processing unit performs at least one of
(i) activating the first photoelectric conversion unit and the second photoelectric conversion unit, and generating the third image information by processing the first image information, the second image information, or both the first image information and the second image information, and (ii) activating the first photoelectric conversion unit, and generating the third image information by processing the first image information.

30. The device according to claim 29, wherein the processing unit interrupts operation of either one of the first imaging unit and the second imaging unit based on the line of sight, and uses image information from the other of the first imaging unit and the second imaging unit.

31. The device according to claim 29, wherein in a case where the processing unit performs (ii), the processing unit deactivates the second photoelectric conversion unit.

32. The device according to claim 31, wherein when the processing unit deactivates the second photoelectric conversion unit, the second photoelectric conversion unit is in a power saving state.

33. The device according to claim 29, wherein the first photoelectric conversion unit includes a first substrate on which the plurality of first photoelectric conversion elements is disposed, and a second substrate on which a circuit configured to process a signal from the plurality of first photoelectric conversion elements is disposed, and
wherein the first substrate and the second substrate are stacked.

34. The device according to claim 29, further comprising a first display unit configured to display a first image that is based on the third image information,
wherein at least three chips including a first chip on which the first photoelectric conversion unit is disposed, a second chip on which the first display unit is disposed, and a third chip on which the first pupil detection unit is disposed are stacked.

35. The device according to claim 29,
wherein the first photoelectric conversion unit acquires sixth image information at a first time, and
wherein, based on the sixth image information, the processing unit generates first prediction image information at a second time later than the first time as the third image information.

36. The device according to claim 35, wherein the processing unit includes an artificial intelligence (AI) unit.

37. The device according to claim 36, wherein the AI unit includes a deep learning function.

38. A wearable device comprising:
the device according to claim 29; and
a power source unit configured to supply power to the device.

39. The wearable device according to claim 38, further comprising an interface unit configured to perform wireless connection with an outside.

* * * * *